US012311586B2

(12) United States Patent
Jones et al.

(10) Patent No.: US 12,311,586 B2
(45) Date of Patent: May 27, 2025

(54) APPARATUS AND METHOD FOR DOSING A FLUID FORMULATION INTO A POLYMERIC MATERIAL

(71) Applicant: COLORMATRIX HOLDINGS, INC., Wilmington, DE (US)

(72) Inventors: Brian Jones, Merseyside (GB); Harry Baker, Merseyside (GB); David Whitehead, Merseyside (GB); Mark Dix-Baker, Merseyside (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 377 days.

(21) Appl. No.: 17/910,238

(22) PCT Filed: Mar. 4, 2021

(86) PCT No.: PCT/IB2021/051802
§ 371 (c)(1),
(2) Date: Sep. 8, 2022

(87) PCT Pub. No.: WO2021/181215
PCT Pub. Date: Sep. 16, 2021

(65) Prior Publication Data
US 2023/0094368 A1 Mar. 30, 2023

(30) Foreign Application Priority Data

Mar. 10, 2020 (GB) ..................................... 2003455

(51) Int. Cl.
*B29C 45/18* (2006.01)
*B29C 48/285* (2019.01)
(52) U.S. Cl.
CPC ........ *B29C 45/1808* (2013.01); *B29C 48/286* (2019.02); *B29K 2995/002* (2013.01)

(58) Field of Classification Search
CPC ...... B67D 3/00; B67D 3/0029; B67D 3/0032; B67D 3/0035; B29C 45/1808;
(Continued)

(56) References Cited

U.S. PATENT DOCUMENTS 4,733,971 A 3/1988 Pratt
5,494,193 A * 2/1996 Kirschner ............ B67D 1/0032
222/383.2
(Continued)

FOREIGN PATENT DOCUMENTS

EP 0965423 A2 6/1999
EP 0983133 B1 11/2004
(Continued)

OTHER PUBLICATIONS

International Search Report for Application No. PCT/IB2021/051802, mailed on Jun. 11, 2021, 12 pages.
(Continued)

*Primary Examiner* — Donnell A Long
(74) *Attorney, Agent, or Firm* — Lippes Mathias LLP

(57) ABSTRACT

Apparatus 2 for dosing a liquid colour formulation into polymer includes a weighing platform 4 which is supported on a pair of load cells 6 which are, in turn, supported on a base 8. A reservoir 12 contains liquid colour formulation 14. A pump 16 is arranged to pump liquid formulation, via a tube 20, to an extruder or injection moulding machine. Above inlet 24 is a delivery pack 26 which includes a bag-in-a-box arrangement 28. The delivery pack 26 includes a transfer pump 36 associated with an outlet of the receptacle 32. A transfer pump motor 38 is arranged to be engaged with the transfer pump 36 and operated so that liquid formulation can be pumped from the receptacle 32 into reservoir 12 across an air gap 13 defined between the transfer pump 36 and the inlet 24 of reservoir 12. There is no pipe, tube or
(Continued)

other conduit through which liquid formulation passes on travel between delivery pack 26 and reservoir 12.

19 Claims, 13 Drawing Sheets

(58) Field of Classification Search
CPC .................. B29C 48/286; B29C 48/05; B29C 2045/1891; B29C 2045/185; B29C 2949/0715; B29C 48/29; B29C 45/1816; B29C 48/297; B29C 48/2552; B29C 48/268; B29C 49/06; B29K 2995/002; B29B 7/244; B29B 7/94; B29B 11/08
See application file for complete search history.

(56) References Cited

U.S. PATENT DOCUMENTS

| | | | | |
|---|---|---|---|---|
| 5,540,355 | A * | 7/1996 | Hancock | B67D 1/0802 222/64 |
| 5,735,436 | A * | 4/1998 | Schroeder | B67D 1/1286 222/383.2 |
| 6,203,184 | B1 * | 3/2001 | O'Callaghan | B29C 48/92 366/156.1 |
| 6,460,734 | B1 * | 10/2002 | Schroeder | B67D 1/0079 222/383.2 |
| 2005/0124734 | A1 | 6/2005 | Hucks et al. | |
| 2007/0115753 | A1 | 5/2007 | Anders et al. | |
| 2009/0115087 | A1 | 5/2009 | Hellenberg et al. | |
| 2009/0145926 | A1 * | 6/2009 | Klopfenstein | B67D 1/07 222/383.2 |
| 2010/0317769 | A1 | 12/2010 | Graf et al. | |
| 2015/0217310 | A1 | 8/2015 | Auer et al. | |

FOREIGN PATENT DOCUMENTS

| | | |
|---|---|---|
| EP | 2454009 B1 | 9/2015 |
| JP | 2018114618 A | 7/2018 |
| WO | 2003035346 A1 | 5/2003 |
| WO | 2008078075 A2 | 7/2008 |
| WO | 2014029740 A1 | 2/2014 |
| WO | 2017042726 A1 | 3/2017 |
| WO | 2017068483 A1 | 4/2017 |
| WO | 2021181215 A1 | 9/2021 |

OTHER PUBLICATIONS

Office Action for Application No. GB2003455.9, dated Sep. 7, 2020, 2 pages.
Examination Report of United Kingdom Patent Application No. GB2003455.9, dated Jan. 30, 2024, 2 pages.
Office Action for GB 2003455.9, dated Sep. 5, 2024, 2 pages.

* cited by examiner

APPARATUS AND METHOD FOR DOSING A FLUID FORMULATION INTO A POLYMERIC MATERIAL

This invention relates to polymeric materials and particularly, although not exclusively, relates to apparatus for and a method of dosing a fluid formulation into a polymeric material. Injection moulded products such as container preforms or continuously extruded products such as fibre may be produced.

It is well-known to dose fluid formulations, for example liquid formulations comprising colour and/or functional additives such as UV blockers, into thermoplastic polymeric materials to produce injection moulded or extruded products. However, it is difficult to confirm dosing systems are functioning with appropriate accuracy and/or ensuring that the correct amount (not too little or too much) of the liquid formulation is dosed into the polymeric material. For example, it is desirable for beverage bottle manufacturers to have certainty on the levels of additive (e.g. colourants) included in bottles product. When a bottle or other receptacle is intended to include a functional additive at a specific level, such as a UV light blocker to prevent deterioration of product contained in the receptacle, it is important to have confidence, from a quality assurance perspective, that the receptacle contains the appropriate amount of the functional additive.

Many receptacles are made from preforms produced by injection moulding in an injection moulding machine. The preforms are then left for a period of time to condition them prior to blowing and stretching them on a stretch blow-moulding machine. Receptacles produced may then be periodically sampled and assessed. For example, the colour of a selected receptacle may be assessed and the level of any functional additive may be assessed, insofar as this is possible. In some case, it may not be readily possible or convenient to assess the level of certain functional additives in blown receptacles in which case it is difficult for a manufacturer of the receptacles to provide a reliable quality assurance (QA) process for such receptacles at least as regards such a functional additive.

In a case wherein colour of a receptacle or the level of functional additive in the receptacle is assessed as a QA process, it should be appreciated that such assessment is undertaken far downstream of a point wherein the colour or functional additive is introduced into a preform which is subsequently stretch blow-moulded to define the receptacle. If a QA assessment shows a receptacle is defective in some way, then all receptacles produced in the period between production of the preform for the defective receptacle and the time when the receptacle is found to be defective must also be presumed to be defective (or will need to be subjected to rigorous testing) and may need to be discarded. Given that it could easily be more than one hour between production of a preform and the assessment of a receptacle produced from it and given that, typically, receptacles are produced at high speed (e.g. 15000 per hour), then tens of thousands of defective receptacles may be produced which need to be discarded.

In a case wherein it is not readily possible or convenient to assess the level of a particular functional additive included in a preform or receptacle, production of a defective receptacle (e.g. containing too little additive) may be even more serious, since the receptacle may be filled with product without assessing the additive level, and sold to customers. The defective receptacle (e.g. having too little of a functional additive such as a UV blocker) may not sufficiently protect the product it contains, thereby reducing its shelf life. The existence of such a product with reduced shelf life may necessitate the recall of many tens of thousands of product-containing receptacles with significant loss to retailers, the manufacturer of the product contained in the receptacle and/or the receptacle manufacturer.

It is an object of the invention, in one preferred embodiment, to address the above described problems and provide an accurate QA system which is able to relatively quickly provide an alert in the event that a defective preform and/or receptacle may be produced.

In more general terms, there are many situations in which it is desired to be able to accurately dose and/or monitor the rate of dosing of fluid formulations into polymeric materials associated with melt processing apparatus.

It is an object of a preferred embodiment of the present invention to address the above described problem.

It is an object of a preferred embodiment of the present invention to provide an apparatus and/or method for confirming on a substantially continuous basis that apparatus for dosing a liquid colour formulation into a polymeric material is functioning with appropriate accuracy.

According to a first aspect of the invention, there is provided apparatus for dosing a fluid formulation into a polymeric material, the apparatus comprising:
(i) a container (A) for containing the fluid formulation, wherein said container (A) includes an outlet for fluid formulation;
ii) a reservoir assembly for containing fluid formulation transferred from container (A), wherein said reservoir assembly includes an inlet for receiving fluid formulation transferred from container (A);
wherein said outlet of said container (A) is arranged to deliver fluid formulation across an air gap into said reservoir assembly.

Thus, a space is suitably defined between said outlet of container (A) and said reservoir assembly for example between said outlet and a part of said reservoir assembly which is closest to said outlet. As a result, there is preferably no physical link or connection between said outlet of container (A) and a wall and/or any physical part of said reservoir assembly. That is, preferably there is no physical link or connection between said outlet of container (A) and a wall and/or any physical part of said reservoir assembly, for example for passage of liquid formulation from container (A) to said reservoir assembly. Thus, is use, fluid formulation falls across free space between container (A) and reservoir assembly (B), suitably before the fluid formulation contacts a physical entity (e.g. a wall of said reservoir assembly and/or fluid formulation already present within said reservoir assembly). The arrangement facilitates accurate monitoring of the weight of said reservoir assembly in use, without the measured weight being affected by container (A) and/or a part thereof. Thus, the apparatus preferably does not include any conduit and/or tube which extends from said container (A) to said reservoir assembly and also contacts both container (A) and said reservoir assembly.

Said outlet of container (A) is suitably a region of container (A) which fluid formulation contacts, in use, immediately before the fluid formulation enters said air gap. Container (A) suitably includes a pump (herein "said first pump") as hereinafter described. Said outlet of container (A) may be an outlet of said first pump. Said first pump is preferably a positive displacement pump. Said first pump is preferably arranged to releasably engage a shaft of a motor which is suitably arranged to drive a rotor of the pump.

Container (A) may include a closure means which is an integral part of said container (A). Said first pump may be arranged to operate as a closure means for container (A) when fluid is not being pumped from container (A), and/or when it is not operatively connected to a motor which is arranged to drive a rotor of the pump, suitably as hereinafter described.

Said container (A) suitably includes said first pump and a container portion, suitably upstream of said first pump, and suitably being arranged to contain fluid formulation. Said container portion is suitably directly connected to the first pump. Said first pump is preferably secured (preferably substantially permanently and/or not releasably secured) to an outlet of said container portion. Said first pump is preferably directly connected and/or abuts an outlet of said container portion. Preferably, no pipe, for example no flexible pipe, extends between said container portion, for example an outlet of said container portion, and said first pump.

Said outlet of container (A) is preferably vertically aligned with said inlet of said reservoir assembly. Thus, said outlet of container (A) is suitably positioned so that fluid formulation can fall under gravity across said air gap for containment in said reservoir assembly. Said outlet of container (A) is preferably spaced from each wall of said reservoir assembly.

Outlet of container (A) could extend into free space within said reservoir assembly, or said outlet of container (A) may be spaced from, for example vertically spaced from (e.g. by a vertical distance of at least 1 mm, for example 1 to 20 mm) said inlet of said reservoir assembly. Said outlet of container (A) is preferably spaced from the nearest horizontally-extending internal wall of said reservoir assembly which is vertically directly below said outlet by a distance of at least 10 mm or at least 50 mm.

Said inlet of said reservoir assembly may be defined in a top wall of said reservoir assembly and said inlet suitably defines an opening which faces upwardly. Said opening may be defined by a collar, wherein preferably a cylindrical wall of said collar extends upwardly, preferably substantially vertically upwards. Said opening may have a maximum width in the range 2 to 10 cm. It is preferably circular and so the preferred diameter of said opening is in the range 2 to 10 cm. Said opening may have an area through which fluid formulation passes in use of at least 4 $cm^2$ and preferably less than 70 $cm^2$. Said opening may have an area in the range 4 to 40 $cm^2$. Said opening preferably is arranged to be closed by a releasably securable closure. Said collar may be screw-threaded and arranged to engage a corresponding screw-threaded closure for closing and/or sealing said inlet of said reservoir assembly when said reservoir assembly is not in use and/or is not part of the apparatus described, such as during transportation or storage of said reservoir assembly.

Said reservoir assembly (preferably a reservoir thereof as hereinafter described) may have a total internal volume (i.e. brim full) of at least 2 litres or at least 3 litres for containing a fluid formulation. The total internal volume may be less than 50 litres or less than 20 litres or less than 6 litres.

Said reservoir assembly (preferably a reservoir thereof as hereinafter described) may have a substantially constant internal cross-sectional area over a length L, wherein L is at least 25 mm, preferably at least 50 mm. Length L may be less than 400 mm or less than 100 mm. The volume of fluid which can be contained within said substantially constant cross-sectional area may be at least 500 $cm^3$, preferably at least 1000 $cm^3$. It may be less than 20000 $cm^3$, less than 10000 $cm^3$ or less than 7000 $cm^3$.

Said substantially constant internal cross-sectional area may at least 100 $cm^2$, preferably at least 200 $cm^2$. It may be less than 2000 $cm^2$, less than 1000 $cm^2$ or less than 600 $cm^2$.

The said substantially constant internal cross-section is preferably curved along its entire extent; preferably it is circular or oval-shaped.

The ratio of the substantially constant internal cross-sectional area divided by the total internal volume of the reservoir assembly (preferably a reservoir thereof as hereinafter described) may be in the range 0.01-0.20, preferably in the range 0.02-0.14, more preferably in the range 0.03-0.10.

Said reservoir assembly is preferably associated with a substantially horizontally disposed platform. Said substantially constant internal cross-sectional area preferably extends substantially parallel to said platform. Length L is preferably measured substantially perpendicular to the platform.

Said reservoir assembly (preferably a reservoir thereof as hereinafter described) is preferably rigid. It is preferably self-supporting. It is preferably not arranged to be compressed to deliver fluid formulation therefrom. Its internal volume is preferably not arranged to change (e.g. reduce) during removal of fluid formulation therefrom (e.g. during removal of fluid from said reservoir of said assembly as hereinafter described).

Said reservoir assembly suitably includes said inlet for input of the fluid formulation into the receptacle. Said inlet is preferably positioned in an upper part of the reservoir assembly (preferably in an upper part of a reservoir thereof as hereinafter described). It is preferably positioned above a maximum fill level of said reservoir assembly (preferably above a maximum fill level of a reservoir thereof as hereinafter described), wherein data on said maximum fill level (e.g. its position) is stored in a central processing unit (CPU) which is suitably a component of said apparatus.

Said apparatus preferably includes a level sensor for assessing the level of fluid formulation in said reservoir assembly (preferably the level in a reservoir thereof as hereinafter described).

Said level sensor is preferably non-invasive. It is preferably arranged so that it does not contact fluid formulation in said reservoir assembly whilst taking a measurement, for example whilst sensing the level of fluid formulation in said reservoir assembly. Said level sensor preferably includes a transmitter for transmitting a signal, for example a wave. Said signal is suitably arranged to be transmitted towards fluid in said reservoir assembly, preferably towards an interface of the fluid with air—that is, the wave is suitably arranged to be transmitted so it impinges the top of fluid formulation contained within said reservoir assembly, suitably to facilitate determination of the level of fluid formulation in said reservoir assembly. Said level sensor preferably includes a receiver for receiving a signal, for example a wave, reflected from fluid formulation in the said reservoir assembly. Said level sensor and/or a CPU associated therewith is suitably arranged to assess the level of fluid formulation in the reservoir assembly from said transmitted and reflected signals, for example waves.

Said transmitter and said receiver of said level sensor are preferably fixed in position relative to one another and/or are fixed to the same housing.

Said level sensor, for example said housing, is preferably mounted so it occupies a positon which, in use, is above fluid formulation in said reservoir assembly. Said level sensor is preferably vertically aligned with said inlet of said reservoir assembly. Said level sensor is preferably an ultrasonic sensor. It suitably comprises a housing which houses both an ultrasonic transmitter and ultrasonic receiver.

Said CPU of said apparatus is suitably programmed so that said reservoir assembly is filled with fluid formulation to a level which is spaced a distance of at least 30 mm from a transmitting face of the level sensor.

Said level sensor is preferably arranged to communicate level information, for example over time, to said CPU which is suitably part of said apparatus.

Said apparatus preferably includes a first weighing means for monitoring the weight of said reservoir assembly and its contents. Said first weighing means may include a platform which supports the reservoir assembly. Said first weighing means is preferably arranged to communicate information relating to the weight of said reservoir assembly over time to said CPU.

Said reservoir assembly is preferably associated with a cradle which is suitably arranged to support said reservoir assembly. The cradle is preferably arranged to be releasably secured to the weighing means, for example said platform. A sensor may be associated with said cradle and/or said weighing means for sensing when said cradle is correctly positioned relative to the weighing means, for example said platform and, preferably, said sensor is arranged to communicate information to said CPU. Said cradle may include a plurality of male or female elements (preferably female elements) arranged to releasably engage the other one of either a male or female element fixed relative to the weighing means, for example said platform.

Said reservoir assembly preferably includes a pump (hereinafter said "second pump") for pumping liquid formulation from said reservoir assembly. Said second pump is preferably an integral part of said reservoir assembly. Said reservoir assembly may comprise a reservoir and said second pump. Said second pump is preferably associated with, for example, secured (preferably substantially permanently and/or not releasably secured) to an outlet of said reservoir. Said second pump is preferably directly connected and/or abuts an outlet of said reservoir. Preferably, no pipe, for example no flexible pipe, extends between said outlet of said reservoir and said pump.

Said second pump is preferably a positive displacement pump. Said second pump is preferably arranged to releasably engage a shaft of a motor which is suitably arranged to drive a rotor of the pump. Said reservoir of said reservoir assembly may include a closure means which is an integral part of said reservoir assembly, Said second pump may be arranged to operate as a closure means for said reservoir assembly when fluid is not being pumped from said reservoir assembly and/or when it is not operatively connected to a motor which is arranged to drive a rotor of the pump, suitably as hereinafter described.

Said first pump and said second pump may be the same or different. Preferably, said first pump and/or said second pump comprise a positive displacement pump (herein a "pd pump") as hereinafter described.

Said pd pump suitably includes a housing having an inlet for connection to a fluid source. The inlet is suitably arranged to be flooded by fluid from said fluid source. Preferably, said inlet is flooded by passage of fluid from said fluid source under the force of gravity and suitably no other force—that is, fluid need not (and preferably is not) pressurized for flooding the inlet.

Said pd pump suitably includes an outlet for fluid pumped by said pd pump.

Said pd pump preferably includes a rotor which is rotatable within the housing and said inlet and said outlet are preferably spaced apart around the path of the rotor in the housing.

Said rotor preferably has an axis of rotation, wherein said inlet is arranged to direct fluid into said housing in a direction which is transverse to, for example perpendicular to, the axis of rotation; and preferably, said outlet is arranged to direct fluid out of said housing in a direction which is transverse to, for example perpendicular to, said axis of rotation. Said inlet and said outlet are preferably circumferentially spaced apart about said axis of rotation.

Preferably, the rotor includes rotor surfaces which form with an internal region of the housing a plurality of closed chambers which travel around the housing as the rotor rotates, to convey fluid from the inlet to the outlet. More particularly, preferably, the chambers travel around the axis but preferably do not travel along the axis. The housing preferably includes a seal which cooperates with the rotor surfaces as the surfaces pass between the outlet and the inlet to prevent passage of fluid past the rotor from inlet to outlet and/or vice versa; and/or to prevent any back-flow of fluid. Thus, the chambers are effectively sealed. Preferably, when the rotor is not rotating, fluid cannot pass between the inlet and outlet. Thus, in this case, the pd pump acts as a closure means, effectively preventing fluid flow, as described above for the first and second pumps.

The axis of rotation of said pd pump may have a length of less than 100 mm, preferably less than 60 mm. The axis of rotation of said pd pump may be in the range 10 to 60 mm, preferably 18 to 50 mm.

The reservoir of said reservoir assembly is preferably arranged to deliver fluid formulation to the inlet of the second pump at a pressure of less than 1.5 bar. Said reservoir assembly is preferably open to the atmosphere. Advantageously, it is preferably not pressurized. Suitably, the apparatus is arranged such that the pressure at the inlet of the second pump is defined by the static head of fluid in the reservoir and atmospheric pressure and no additional means is provided for pressurizing the reservoir. Preferably, the reservoir and second pump are arranged for flooded suction of said second pump with fluid from the reservoir.

The container portion of said container (A) is preferably arranged to deliver fluid formulation to the inlet of the first pump at a pressure of less than 1.5 bar. Said container (A) is preferably subjected to atmospheric pressure only. It is preferably not pressurized. Preferably, the container portion and first pump are arranged for flooded suction of said first pump with fluid from the container portion.

In a first embodiment, said second pump may be arranged to pump fluid formulation to an outlet of the apparatus. In this case, preferably, the only pump provided between an outlet of said reservoir and an outlet of said apparatus is said second pump. Such an arrangement may be used to introduce fluid formulation into polymeric material (for example polymeric material which is not molten and/or is at ambient pressure) at relatively low pressure. In this case, the outlet of said apparatus may be arranged to deliver fluid formulation onto solid pellets of polymeric material. The solid pellets may be upstream of a melting zone of a melt-processing apparatus with which the apparatus may be associated and/or operatively connected.

In a second embodiment, said apparatus may be arranged to introduce fluid formulation into polymeric material (for example polymeric material which is molten), for example at relatively high pressure (e.g. at greater than 50 bar). In this case, an outlet of said apparatus may be arranged to deliver fluid formulation into molten polymer in a melt-processing apparatus (e.g. injection moulding machine or extruder). The apparatus may be associated with and/or operatively connected to a melt-processing apparatus as described.

Preferably, a pipe is connected to an outlet of said second pump wherein said pipe is arranged to deliver fluid formulation into polymeric material for example associated with a melt processing apparatus, for example an injection moulding machine or an extruder. A part of said pipe is preferably secured, for example clamped, to a part of the apparatus at a first position. Said first position is suitably such that its position does not change when said weighing means, for example said platform, moves as the weight of reservoir assembly changes. Said first position is suitably not fixed in position relative to said weighing means, for example said platform. Securement of said pipe at said first position is suitably arranged to minimise (and preferably eliminate) movement of the pipe between said first position and a position of connection of the pipe to the outlet of the second pump. Consequently, a portion of the pipe downstream of the first position can be manipulated (e.g. to position it for delivery of fluid formulation onto polymeric material) without any such movement being transmitted to the weighing means (which might otherwise affect the weight measured).

Said pipe may have an inside diameter in the range 0.2 to 1.5 cm preferably 0.3 to 0.9 cm and/or a length in the range 50 cm to 5 m or 60 cm to 3 m.

Said container (A) is suitably in fluid communication with said reservoir assembly and is suitably arranged to contain the same fluid formulation as contained in said reservoir assembly. The apparatus is suitably arranged for fluid from container (A) to be transferred to said reservoir assembly to replenish fluid in the reservoir assembly.

Container (A) preferably has a greater total internal volume than said reservoir assembly, for example said reservoir thereof. The ratio of the total internal volume of container (A) divided by the total internal volume of said reservoir assembly may be at least 1.5, for example in the range 1 to 500 or, preferably 1.5 to 10.

Said container (A) suitably includes said first pump and a container portion as described. Said container portion may be collapsible. It preferably comprises a plastics receptacle. Said container (A) may comprise a cardboard box in which said container portion is arranged. Said container (A) may comprise a bag-in-a-box arrangement, suitably with said first pump being directly connected to and/or abutting an outlet of said container portion.

Said container (A) is suitably positioned above (preferably entirely above) said reservoir assembly. Container (A) suitably has a footprint which wholly overlies a footprint defined by said reservoir and/or said reservoir assembly. Thus, container (A) is suitably superimposed on the reservoir and/or reservoir assembly. The footprint of container (A) may have an area in the range 200 to 2000 cm$^2$, for example 200 to 1400 cm$^2$ or 500 to 1200 cm$^2$. The footprint of said reservoir and/or said reservoir assembly may be in the range 2000 to 32000 mm$^2$, for example 5000 to 25000 mm$^2$.

Said apparatus preferably includes a second weighing means for monitoring the weight of container (A) and its contents. Said second weighing means may include a second platform which supports container (A). Said weighing means is preferably arranged to communicate information relating to the weight of container (A) over time to said CPU.

When said second weighing means includes a second platform, said second platform is suitably arranged to releas-ably engage the container (A). Preferably, said second platform overlies said first platform when provided. Said first and second platforms are suitably vertically spaced apart with at least 50%, 90% or 100% of the footprint of said second platform overlying the footprint of said first platform.

Said CPU associated with the apparatus for dosing is suitably arranged to receive an input related to a rate of injection of said fluid formulation into polymeric material which may be present in a melt-processing apparatus associated with said apparatus for dosing.

Said CPU is preferably arranged to control the operation, for example the speed, of said second pump. Said second pump may be the primary control of the rate of introduction of fluid formulation into said polymeric material. Other information monitored by said CPU may verify that the second pump is working appropriately. For example, information related to the level of fluid formulation in said reservoir assembly and/or information related to the change in weight of said reservoir assembly over time may be used to check operation of said second pump.

Said CPU is suitably arranged to receive an input related to a let-down-ratio (LDR).

The invention extends to said apparatus for dosing in combination with a melt-processing apparatus, suitably so an outlet of the apparatus is arranged to deliver fluid formulation from said apparatus to polymeric material arranged to be melt-processed in said melt-processing apparatus. Said melt-processing apparatus may comprise an injection moulding machine or extruder.

Said apparatus may be mounted on a transportation vehicle. Preferably, the transportation vehicle supports container (A) and said reservoir assembly, both of which contain fluid formulation. The transportation vehicle may be arranged to be rolled to a position in which it is to be used, for example a position adjacent a melt-processing apparatus. The transportation vehicle may include wheels or rollers. The footprint of the vehicle may have an area less than 10000 cm$^2$ or less than 7000 cm$^2$. It may be at least 3000 cm$^2$.

Unless otherwise stated, viscosity described herein may be measured using a Brookfield Viscometer at 20 rpm and 23° C.

Said fluid formulation may have a viscosity of at least 1000 cP, suitably at least 10000 cP, preferably at least 15000 cP. The viscosity may be less than 75,000 cP, preferably less than 40,000 cP, more preferably less than 35,000 cP.

Said fluid formulation could comprise a single fluid. Preferably, however, said fluid formulation includes at least two different components. Said fluid formulation may include a plurality of components which are liquid at STP. In one embodiment, said fluid formulation may only include components which are liquid at STP. In another embodiment, said fluid formulation may include at least one component which is a liquid at STP and at least one component which is a solid at STP.

Said fluid formulation may include at least 20 wt %, suitably at least 30 wt %, preferably at least 40 wt %, more preferably at least 50 wt %, especially at least 60 wt %, solids. Said solids may comprise particulate material, for example solid pigments and/or dyes. Said fluid formulation may include 85 wt % or less of solids of the type described. Said fluid formulation suitably includes 15 to 70 wt %, preferably 15 to 50 wt % of fluid, for example liquid. Said solids are suitably provided as a dispersion in a fluid which is suitably a vehicle. Thus, the solids may be generally insoluble in the vehicle. The ability to use highly loaded formulations (and consequently relatively low vehicle levels) may be advantageous in minimizing any detrimental effect associated with incorporation of vehicle into the polymeric material.

Said solids may be arranged to adjust a property of a polymeric material into which they may be delivered by the apparatus. Said solids may comprise any material that it is desired to introduce into a plastics material and may be selected from colourants, UV filters, oxygen absorbers, antimicrobial agents, acetaldehyde scavengers, reheat additives, antioxidants, light stabilizers, optical brighteners, processing stabilizers and flame retardants. Colourants may comprise pigments or dyes.

Said solids preferably comprise insoluble colourants (i.e. insoluble in the vehicle), for example insoluble pigments or dyes. In some embodiments, partially soluble colourants or other additives may be used.

Said vehicle is suitably a liquid at STP. Said fluid formulation is preferably a liquid at STP. Said vehicle preferably has a boiling point (at atmospheric pressure of 760 mmHg) of greater than 300° C., preferably greater than 350° C., more preferably greater than 500° C. The boiling point may be less than 1150° C. or less than 1000° C.

Said reservoir assembly preferably contains a fluid formulation as described. Container (A) suitably includes a fluid formulation, with the fluid formulation in container (A) and said reservoir assembly being identical. The apparatus is suitably arranged to deliver fluid formulation from said reservoir assembly so it contacts polymeric material, wherein the fluid formulation which contacts the polymeric material is identical to the fluid formulation in said reservoir assembly.

According to a second aspect of the invention, there is provided a method for dosing a fluid formulation into a polymeric material, the method comprising:
   (a) selecting an apparatus which includes:
   a container (A) which contains a fluid formulation and an outlet for said fluid formulation; and
   a reservoir assembly containing fluid formulation transferred from said container (A), wherein said reservoir assembly includes an inlet for receiving fluid formulation transferred from container (A);
   (b) delivering fluid formulation from container (A) to said reservoir assembly;
   (c) delivering fluid formulation into said polymeric material downstream of said reservoir assembly.

The method preferably uses apparatus as described according to the first aspect.

The method preferably comprises delivering fluid formulation across an air gap on passage from container (A) into said reservoir assembly. During the method, the fluid formulation preferably falls through a distance of at least 1 mm, at least 5 mm or at least 10 mm, across said air gap. The air gap may extend from an outlet of said container (A) to a wall of said reservoir assembly or to a surface of fluid formulation already contained in said reservoir assembly.

Said container (A) may have any feature of container (A) of the first aspect. Said reservoir assembly may have any feature of said reservoir assembly of the first aspect. Said fluid formulation may have any feature of container (A) of the first aspect.

Said method preferably comprises a CPU of the apparatus controlling operation of a first pump which is part of said container (A).

Said method preferably comprises said CPU receiving information related to the weight of said container (A). Said method preferably comprises said CPU receiving information related to the weight of said reservoir assembly.

Said method preferably comprises said CPU controlling operation of a second pump which is arranged to pump fluid formulation from said reservoir assembly to deliver fluid formulation into said polymeric material.

The method may comprise an operator inputting information into said CPU in dependence on a desired dose rate (e.g. a let-down ratio (LDR)) of said fluid formulation into said polymeric material.

Said method preferably comprises the CPU receiving information related to the level of fluid formulation in said reservoir assembly. The level of fluid formulation may be assessed by said level sensor as described in the first aspect.

In the method, the rate of delivery of fluid formulation by said second pump is the primary parameter which is set to determine the rate of dosing of fluid formulation into said polymeric material. The CPU may be arranged to compare the rate of delivery of fluid formulation by said second pump to information related to the level of fluid formulation in said reservoir assembly and/or information related to the change in weight of said reservoir assembly over time, suitably to confirm the apparatus (in particular the rate of delivery of fluid formulation into said polymeric material) is functioning correctly. If there is a discrepancy, the CPU may initiate operation of an alarm or signal to an operator.

The method may comprise an operator inputting into said CPU information on the amount of polymeric material per shot for a batch process and/or information on the throughput of said polymeric material in a said melt processing apparatus.

In step (c) of the method, a pipe is suitably extended between said reservoir assembly and said melt processing apparatus.

The method may comprise replacing the container (A) when the amount of fluid formulation in it falls below a predetermined level, for example as assessed by its weight.

The method may comprise replacing the reservoir assembly including said second pump thereof after a predetermined time, for example after a predetermined volume of fluid formulation has been delivered via said second pump, suitably as assessed by said CPU.

The method may comprise modifying the apparatus to deliver an alternative fluid formulation, wherein said method comprises replacing container (A) and said reservoir assembly including said second pump with an alternative container (A) and alternative reservoir assembly including a said second pump, wherein said container (A) includes said alternative fluid formulation.

According to a third aspect of the invention, there is provided a container (A) for a fluid formulation for dosing into a polymeric material, said container (A) comprising:
   i) a container portion for containing the fluid formulation;
   ii) a first pump connected to said container portion and being a component of said container (A), said first pump being for pumping fluid formulation from the container portion for dosing said formulation into said polymeric material, wherein said container (A) contains fluid formulation as described herein.

Said container (A) may be as described in the first aspect.

According to a fourth aspect of the invention, there is provided a reservoir assembly for containing fluid formulation transferred from container (A), wherein said reservoir assembly includes an inlet for receiving fluid formulation transferred from container (A), wherein a second pump is provided for pumping fluid formulation from said reservoir assembly, wherein said second pump is an integral part of said reservoir assembly and wherein said container (A) contains fluid formulation as described herein.

Said reservoir assembly may be as described in the first aspect.

The invention extends to a collocation comprising a container (A) according to the third aspect and a reservoir assembly according to the fourth aspect, wherein suitably said container (A) and said reservoir assembly include at least a residue of the same fluid formulation.

In another aspect, there is provided apparatus for dosing a fluid formulation into a polymeric material, the apparatus comprising:
(i) a container (A) for containing the fluid formulation, wherein said container (A) includes an outlet for fluid formulation;
ii) a reservoir assembly for containing fluid formulation transferred from container (A), wherein said reservoir assembly includes an inlet for receiving fluid formulation transferred from container (A);
wherein said apparatus includes any feature of the apparatus according to the first aspect.

Any feature of any aspect of any invention or embodiment described herein may be combined with any feature of any aspect of any other invention or embodiment herein mutatis mutandis.

Specific embodiments of the invention will now be described, by way of example, with reference to the accompanying drawings, in which.

In the figures, the same or similar parts are annotated with the same reference numerals.

Figure 1:
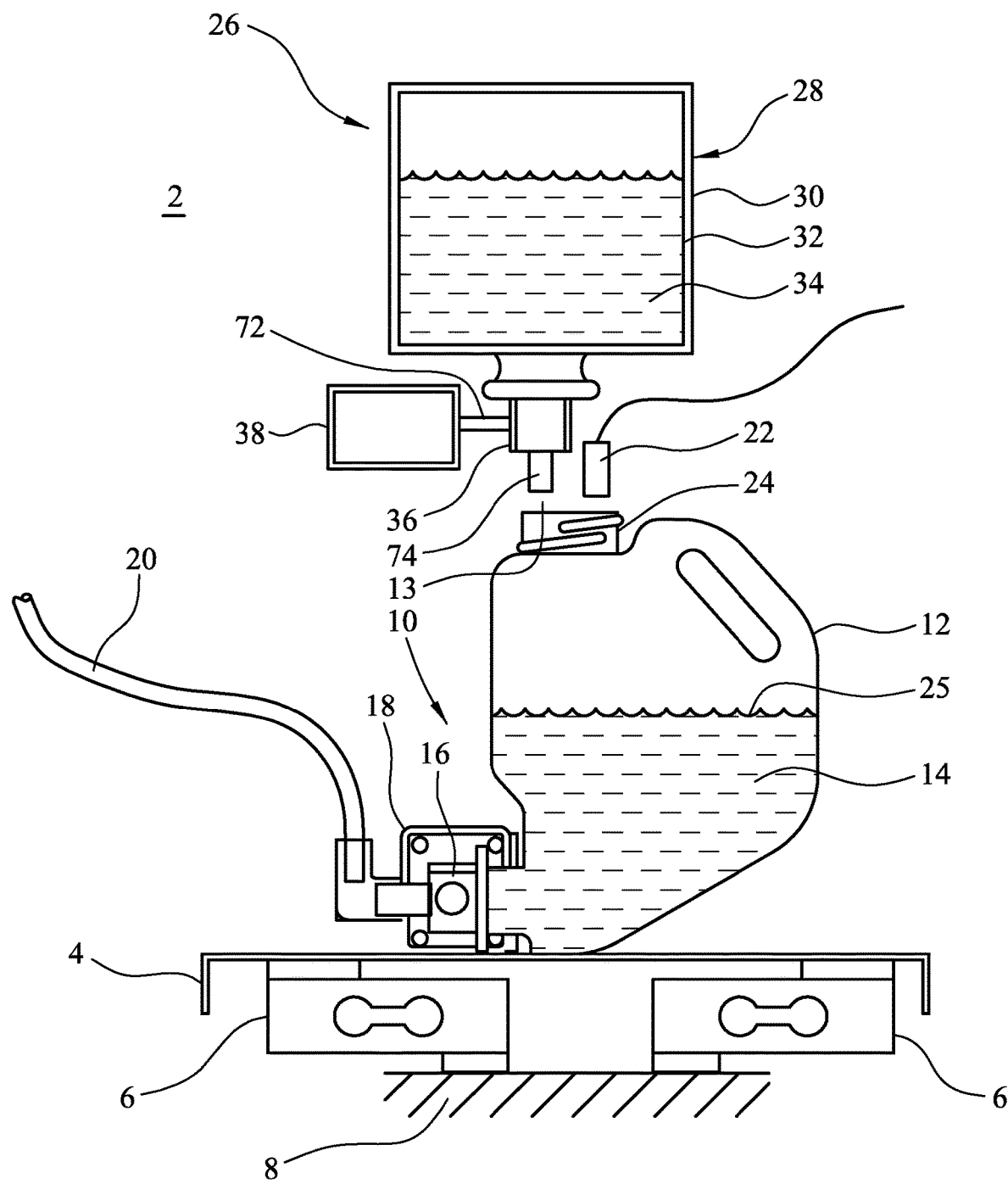
FIG. 1 is a schematic front view, partly cut away, of parts of dosing apparatus.

Referring to FIG. 1, apparatus 2 for dosing a liquid colour formulation, optionally including other additives, into polymer includes a weighing platform 4 which is supported on a pair of load cells 6 which are, in turn, supported on a base 8. A reservoir assembly 10 includes a reservoir 12 which contains liquid colour formulation 14. The assembly 10 includes an integrated metering pump 16 at its outlet, the pump 16 being arranged to be driven by an associated motor 18.

The pump 16 is arranged to pump liquid formulation, via a tube 20, to a polymer processing machine (not shown), for example an extruder or injection moulding machine, where the liquid formulation is mixed with polymer. An extruded or moulded product incorporating polymer and one or more additives delivered via the liquid formulation is produced.

An ultrasonic level sensor 22 is positioned above an inlet 24 of the reservoir 12 and is arranged to continuously monitor the level (e.g. level 25) of liquid formulation within receptacle 12.

Also above the inlet 24, is a delivery pack 26 which includes a bag-in-a-box arrangement 28. The arrangement 28 includes a cardboard box 30 in which a receptacle 32 is arranged. The receptacle 32 contains liquid formulation 34. The delivery pack 26 also includes a transfer pump 36 associated with an outlet of the receptacle 32. A transfer pump motor 38 is arranged to be engaged with the transfer pump 36 and operated so that liquid formulation can be pumped from the receptacle 32 into reservoir 12 across an air gap 13 defined between the transfer pump 36 and the inlet 24 of reservoir 12. There is no pipe, tube or other conduit through which liquid formulation passes on travel between delivery pack 26 and reservoir 12.

The apparatus 2 and components thereof are described in further detail below.

Figure 2:
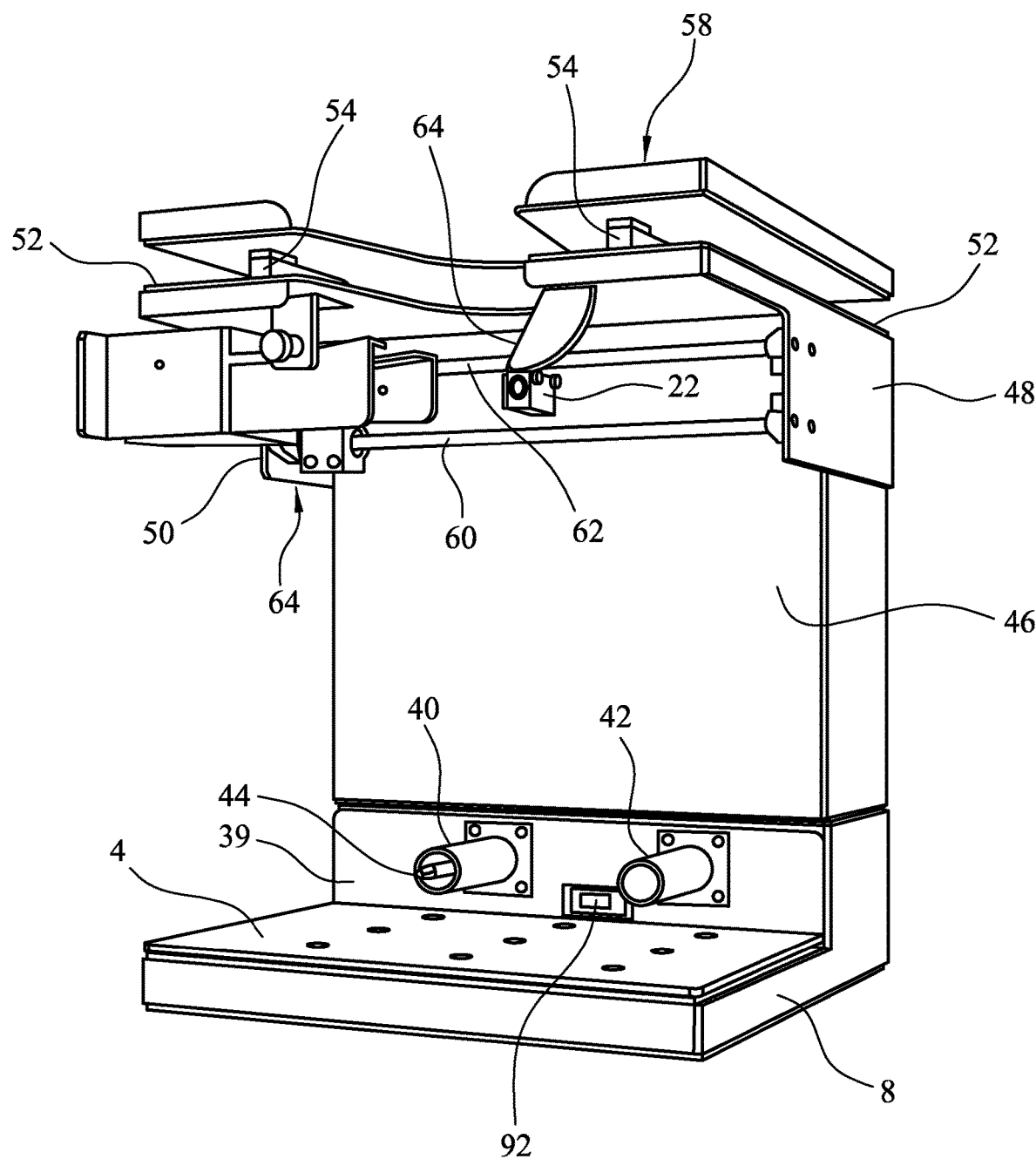
FIG. 2 is a front view of a framework of the apparatus.

Referring to FIG. 2, platform 4 (and associated load cells not shown) is supported on base 8. The platform 4 has an L-shaped cross-section, with the shorter, upright limb 39 of the L-shape including spaced apart support tubes 40, 42. The support tubes 40, 42 are arranged to releasably engage (and support) a cradle (shown in FIGS. 5 to 7) which includes reservoir 12. The support tube 40 includes a drive shaft 44 which is operatively connected to motor 18 (not shown in FIG. 2 but represented in FIG. 1) which is housed behind upright limb 39 of platform 4. The motor is operable to drive shaft 44 which, in turn, is arranged to operate metering pump 16.

The apparatus includes a framework comprising an upright part 46. Opposing flanges 48, 50 are fixed adjacent an upper end of the upright part 46 and support a horizontal platform 52. Platform 52 includes load cells 54 which support an upper platform 58. Platforms 52, 58 are superposed and include aligned semi-circular openings through which a neck of receptacle 32 is arranged to extend.

Upper platform 58 is arranged to releasably engage delivery pack 26 which, in use, is supported thereon. The load cells 54 are arranged to monitor the weight of the delivery pack 26 as liquid is transferred from receptacle 32.

Additionally, opposing flanges 48, 50 support horizontally-extending guide rails 60, 62 which extend therebetween. The guide rails support a carriage assembly 64 which includes transfer pump motor 38 (not shown in FIG. 2). The carriage assembly 64 is arranged to be moved towards transfer pump 36 so that the transfer pump motor 38 can be operatively connected thereto. The assembly 64 can be moved away from the transfer pump 36 when not in use and/or to allow the delivery pack 26 to be disengaged from the apparatus 2.

The level sensor 22 is fixed to a plate 64 which depends from an underside of platform 52.

Figure 3:
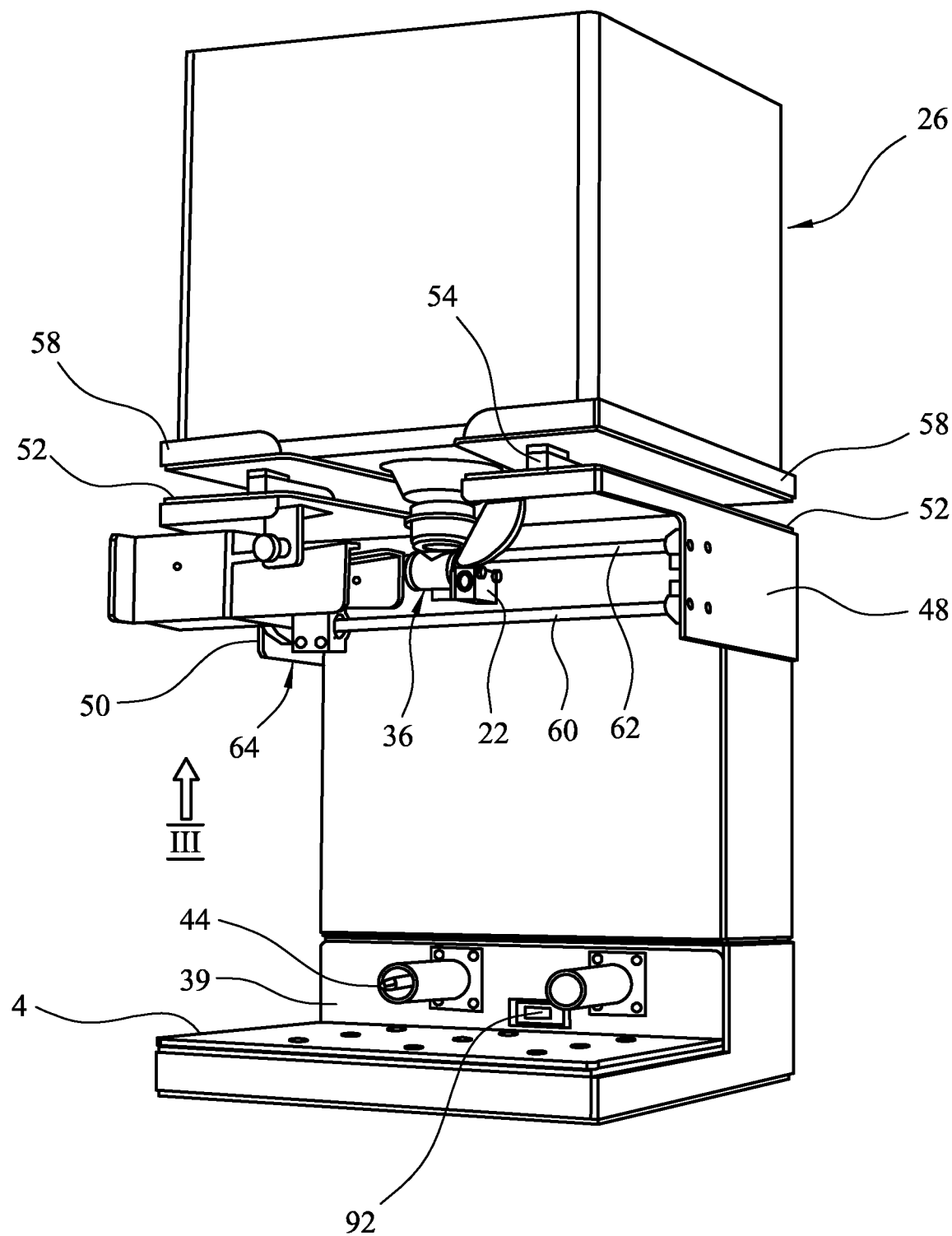
FIG. 3 is a front view of the apparatus with a delivery pack engaged with the framework.
Figure 4:
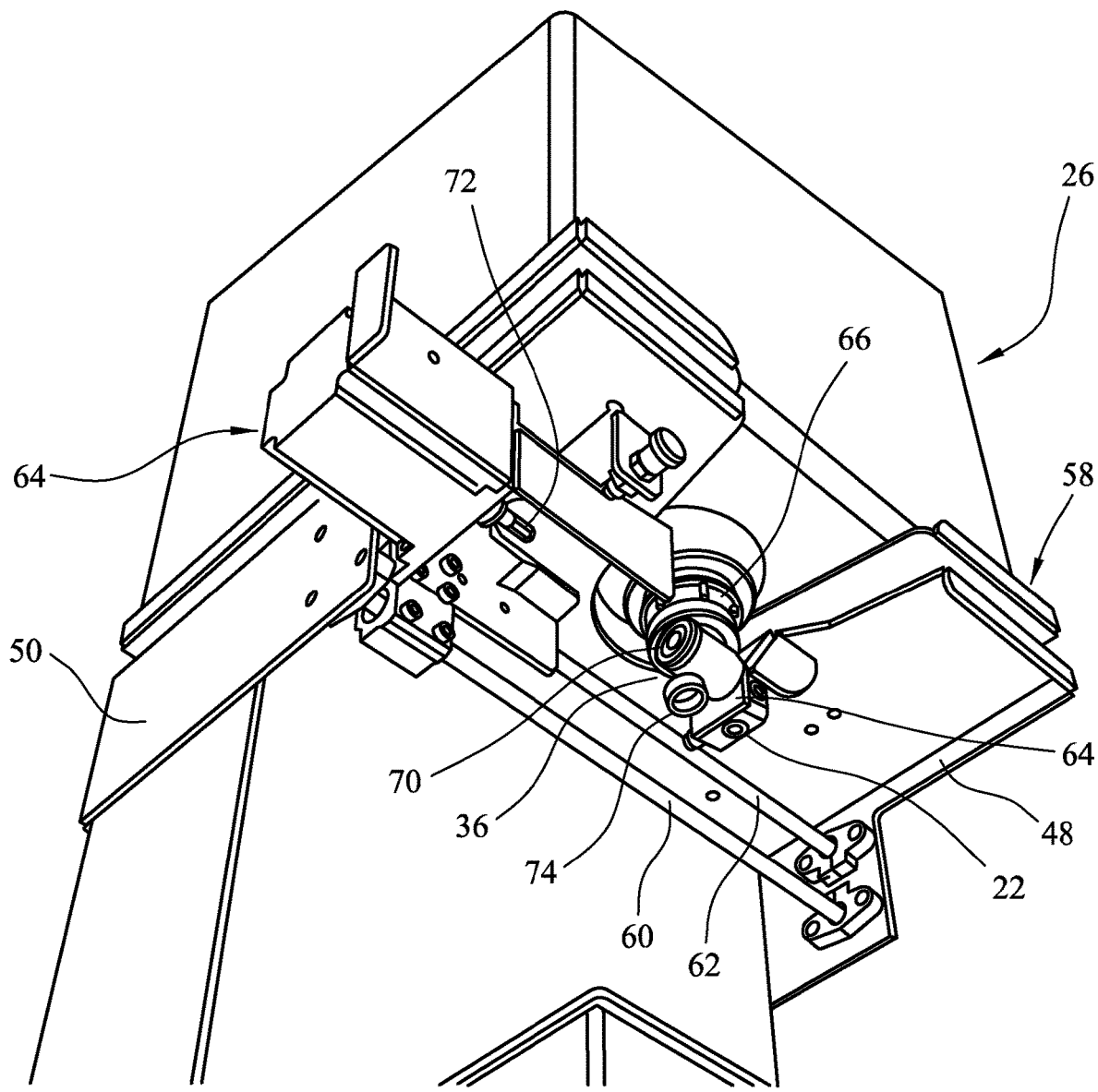
FIG. 4 is a underneath view, in the direction of arrow III, of FIG. 3.

Referring to FIGS. 3 and 4, delivery pack 26 is in position, engaged with and supported by upper platform 58. When so disposed, the outlet 66 of receptacle 32, associated transfer pump 36 and its outlet 74 are positioned below the plane of a lower surface of upper platform 58.

It should be noted that the delivery pack 26 includes the bag-in-a-box arrangement 28 described and an integral transfer pump 36 details of which are provided hereinafter.

Pump 36 includes a splined mechanism (not shown) within opening 70 (FIGS. 4 and 8) which extends transverse to the direction of flow of fluid through the pump. The splined mechanism is arranged to be engaged by a drive shaft 72 (FIGS. 1 and 4) which is operatively connected to and arranged to be driven by motor 38. More particularly, drive shaft 72 may be moved towards the splined mechanism to engage the pump 36 on movement of carriage assembly 64 which includes the transfer pump motor 38. When so disposed, the motor 38 can cause a rotor within pump 36 to rotate and thereby pump fluid from receptacle 32 and out of the pump via outlet 74 which is positioned above inlet 24 of reservoir 12 as clearly shown in FIG. 8.

Figure 5:
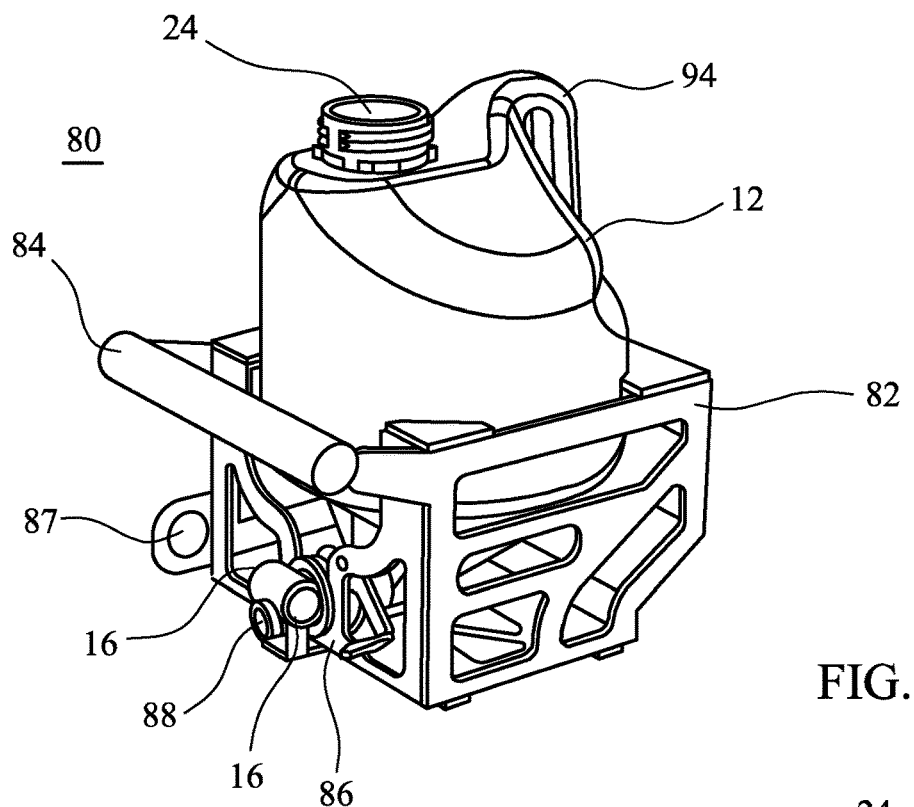
FIG. 5 is a front perspective view of an assembly comprising a cradle and reservoir.
Figure 6:
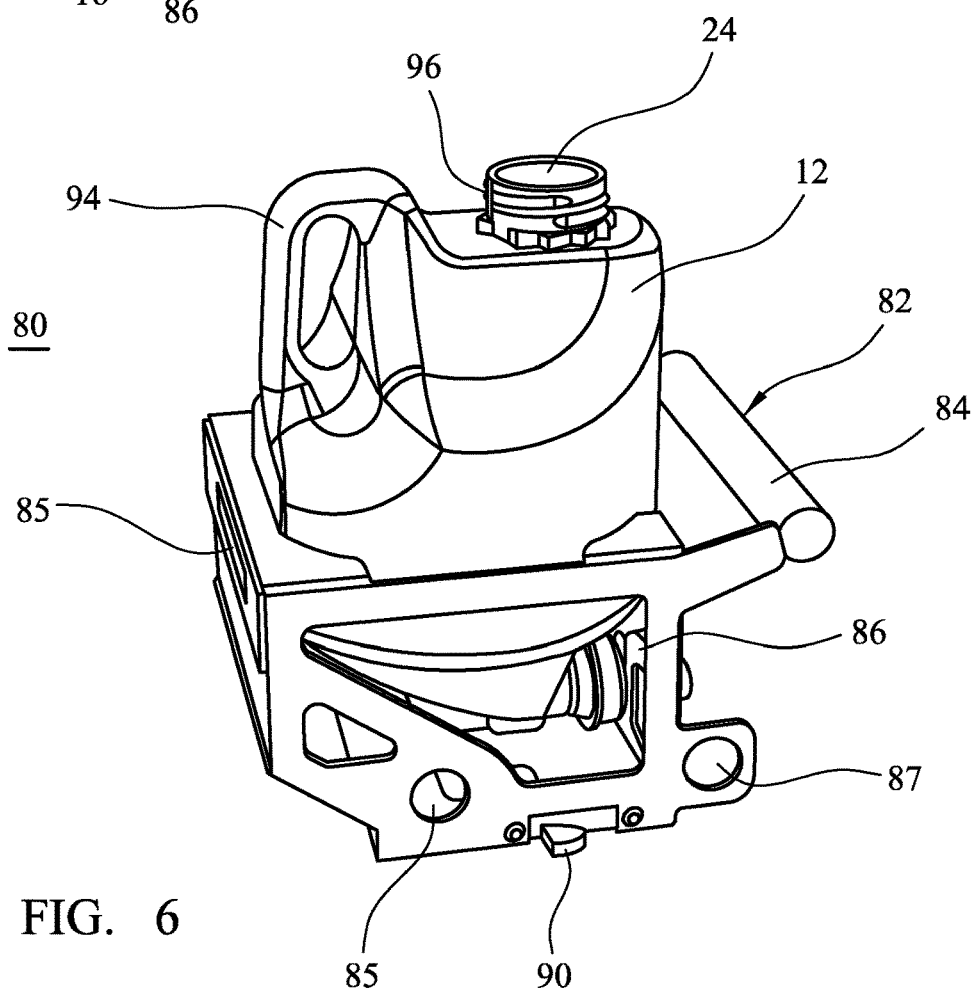
FIG. 6 is a view of the assembly of FIG. 5 from an opposite side.

Referring to FIGS. 5 and 6, assembly 80 comprises a reservoir 12 supported within a cradle 82. The assembly 80 is arranged so the reservoir can be releasably engaged with the cradle 82; and when engaged with the cradle the reservoir is substantially immovable relative to the cradle.

The cradle 82 is made from metal. It includes a handle 84 and a hand-engagement opening 85 by means of which the assembly can be readily handled by an operator, for example to engage or disengage it with the platform 4. The cradle 82 defines a support region 86 which engages a collar of pump 16 to seat the pump 16 in position in the cradle, with an outlet 88 of the pump facing away from the cradle.

Pump 16 includes a splined mechanism (not shown) which is arranged to be engaged with drive shaft 44 (FIG. 2) which extends within support tube 40 and is arranged to be driven by motor 18, positioned behind limb 39. The pump 16 may be as described for pump 36 hereinafter.

Cradle 82 includes circular openings 85, 87 which are arranged to slideably engage respective support tubes 40, 42. In addition, cradle 82 includes a catch member 90 (FIG. 6) which is arranged to engage a cooperable catch member 92 (FIGS. 2 and 3) associated with limb 39 thereby to releasably secure the cradle 82 in position.

The reservoir 12 is made from a plastics material. It includes a handle 94 for ease of manipulation. Inlet 24 is defined by an externally screw-threaded collar 96. The outlet of the reservoir 12 is effectively defined by outlet 88 of the pump 16 which outlet extends transversely to the direction in which liquid is introduced into the reservoir 12 via inlet 24.

Tube 20 is connected to outlet 88 and is secured to platform 4 at position 100 and clamped to flange 50 at position 102. This arrangement is arranged to minimise the effect of any movement of the tube 20 downstream of position 102 (e.g. at position 104) on the weight of platform 4 as measured by load cells 6.

In a preferred embodiment, components of apparatus 2 may have characteristics as follows:
  (a) Weighing platform 4—width 300 mm, depth 200 mm.
  (b) Reservoir 12—volume 3.7 ltr (nominally to contain about 3 Kg of liquid colour formulation dependent on the formulation density).
  (c) Tube 20—diameter 0.95 cm (⅜ inch O.D); 0.64 cm (¼ inch I.D)
  (d) Metering pump 16—The pump is arranged to displace up to 2 cc/rev and can be operated at a rotational speed up to 500 rpm.
  (e) Transfer pump 36—The pump is arranged to displace up to 2 cc/rev and can be operated at a rotational speed up to 500 rpm. It may deliver up to 1000 cc per minute.
  (f) Receptacle 32—volume 27 litres.
  (g) Distance between pump 36 and the inlet 24 of reservoir 12 is 5 mm.

The apparatus described and an associated central processing unit (CPU) is arranged to be packaged safely (i.e. with appropriate protection) in a cuboid box of dimensions: width 410 mm, depth 460 mm and height 450 mm, when in a disassembled state. On removal from the box, the partially pre-assembled apparatus may be fully assembled and readied for use as described below.

Figure 7:
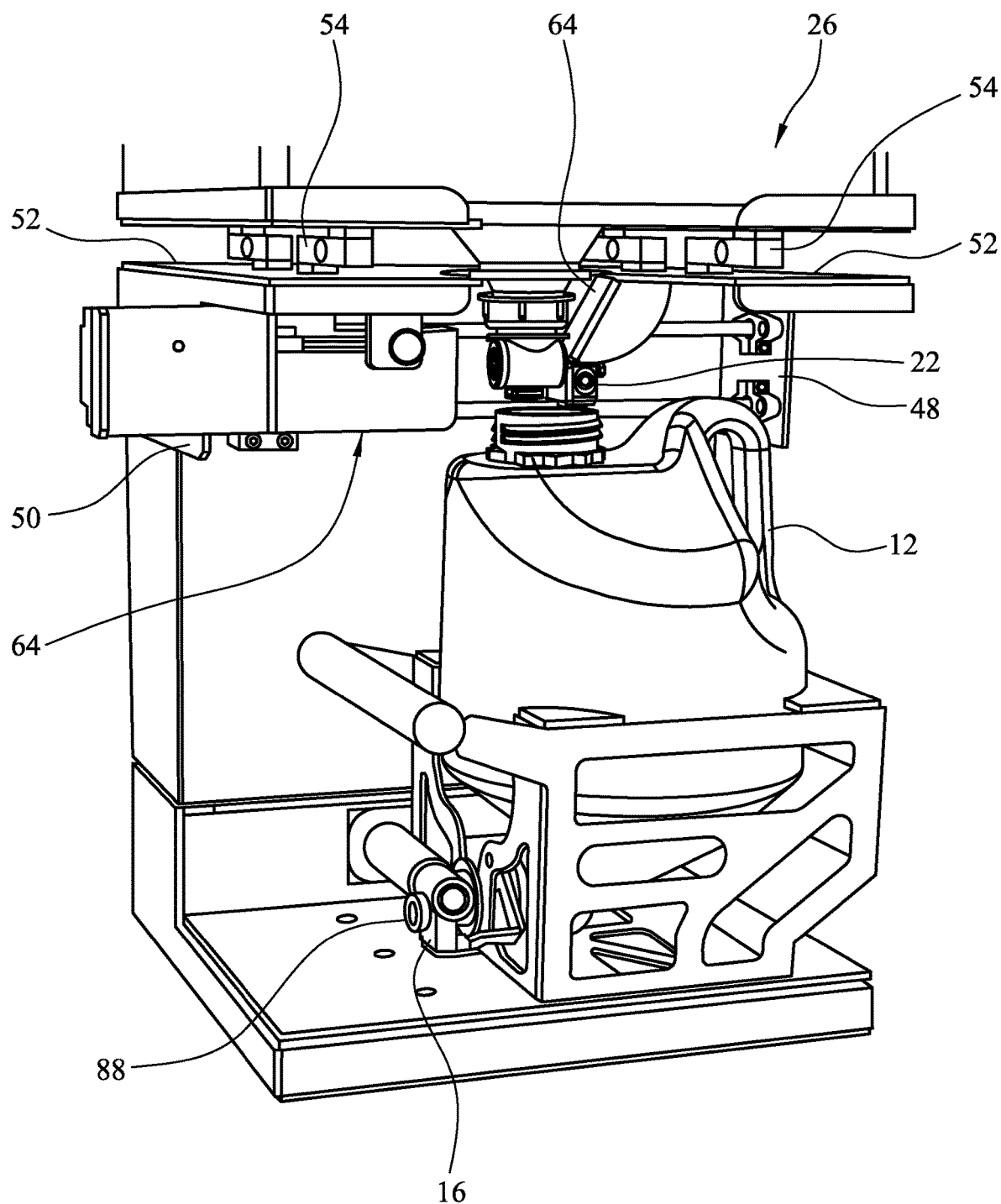
FIG. 7 is a front view of the apparatus with the assembly of FIG. 5 in position (but with part of the delivery pack omitted)
Figure 8:
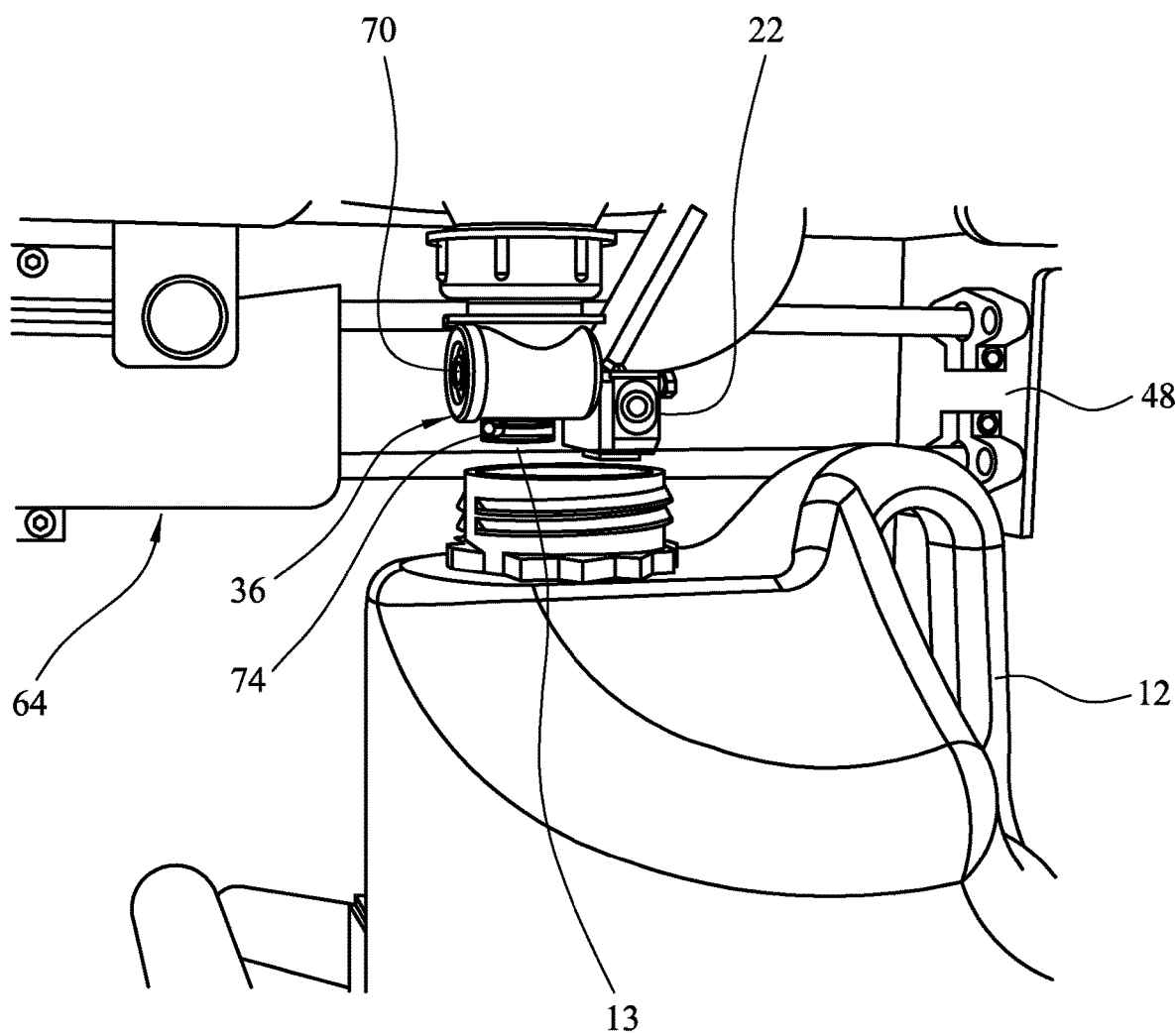
FIG. 8 is a view of part of FIG. 7 on an enlarged scale.
Figure 9:
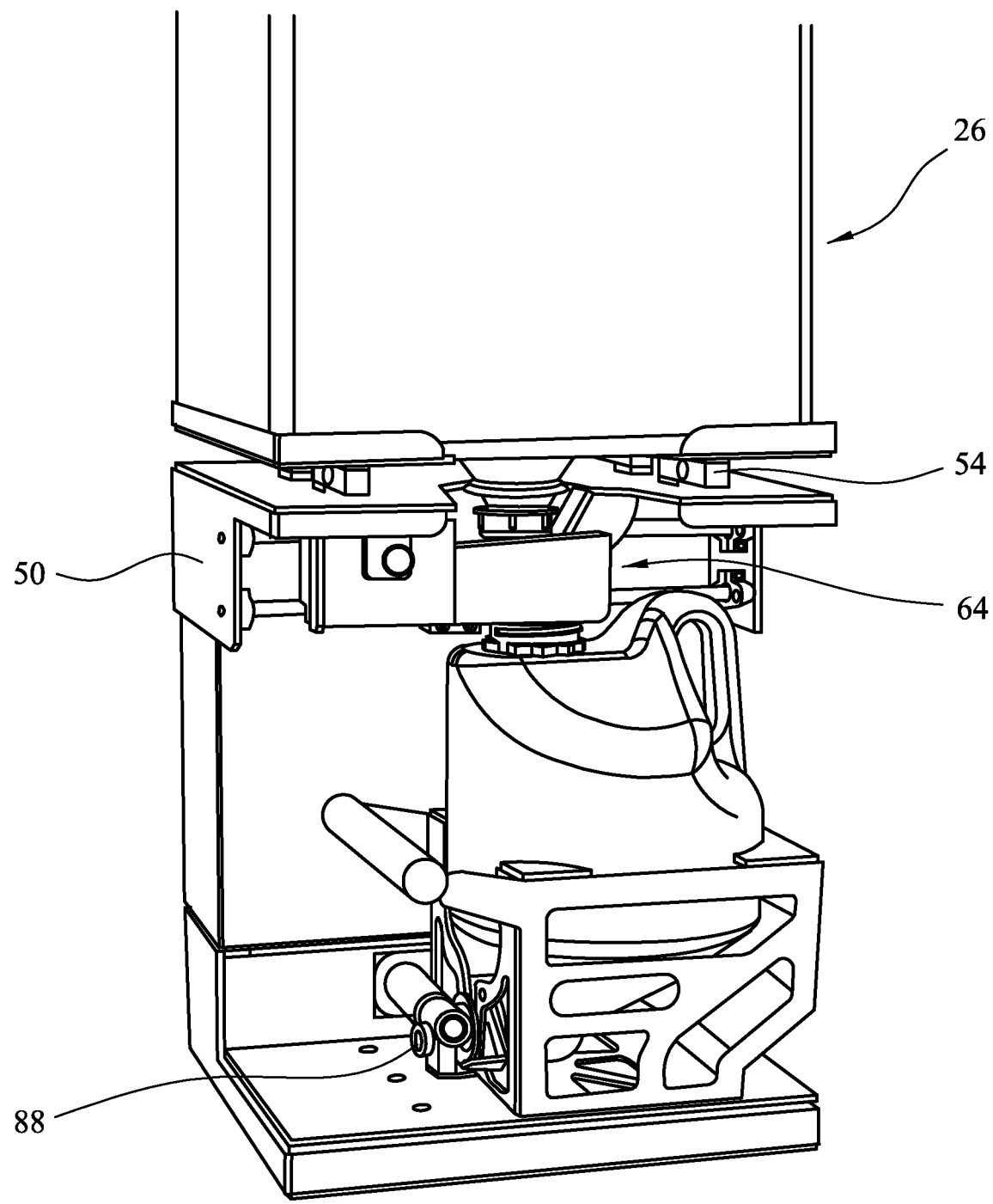
FIG. 9 is a front view of the apparatus in an operative configuration.
Figure 10:
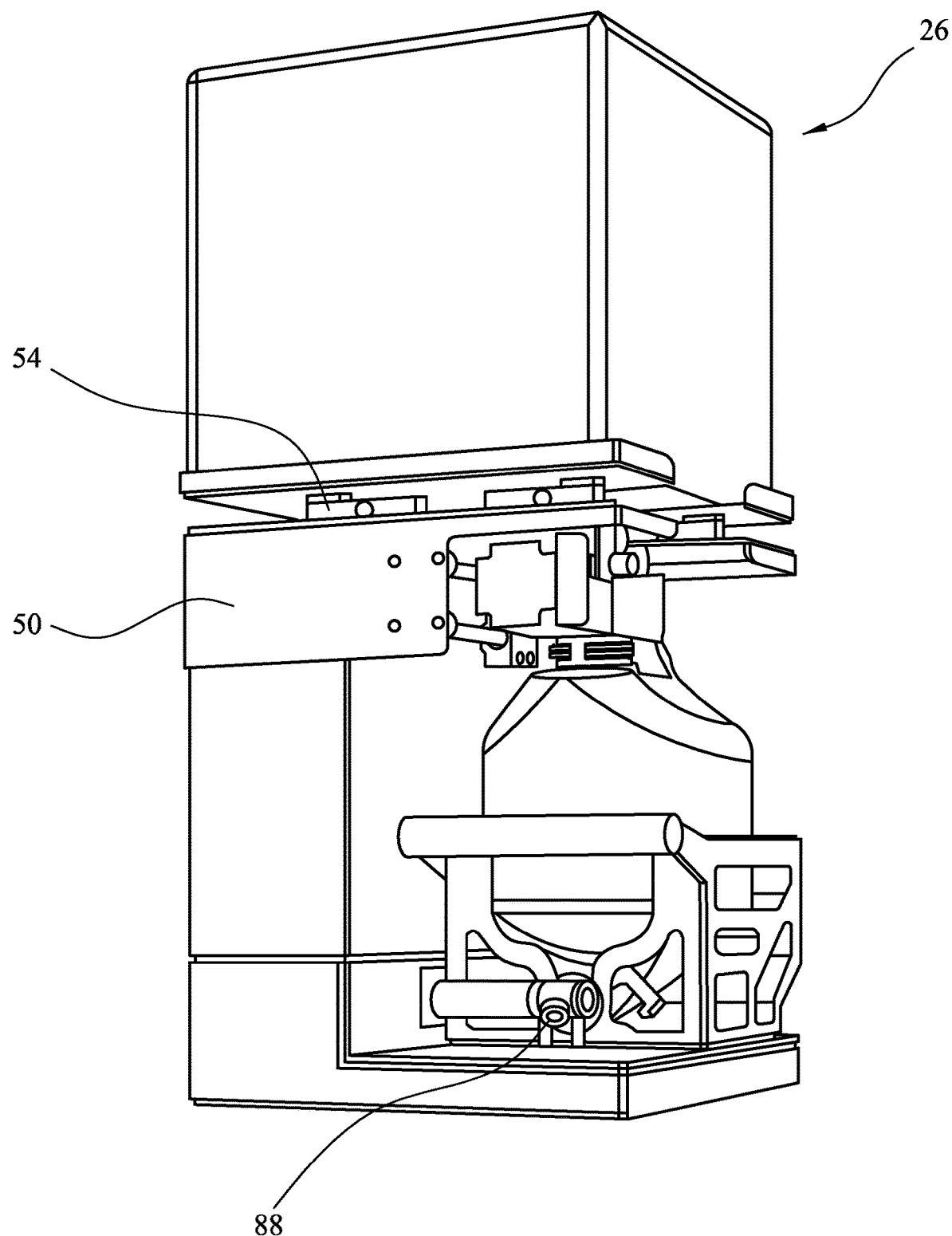
FIG. 10 is a side view of the apparatus of FIG. 9 in an operative configuration.
Figure 11:
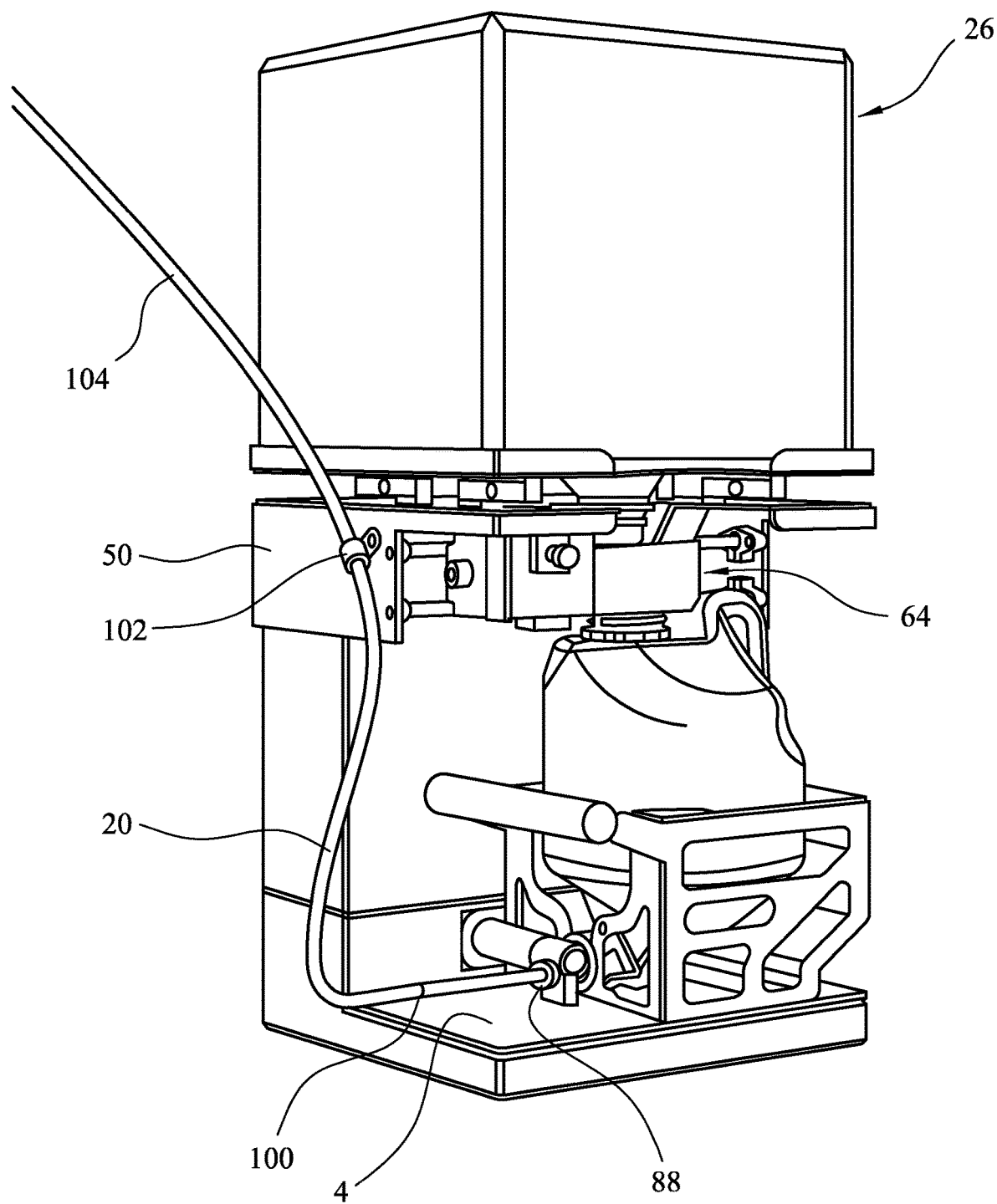
FIG. 11 is a view similar to that of FIG. 9, additionally showing a delivery tube.
Figure 12:
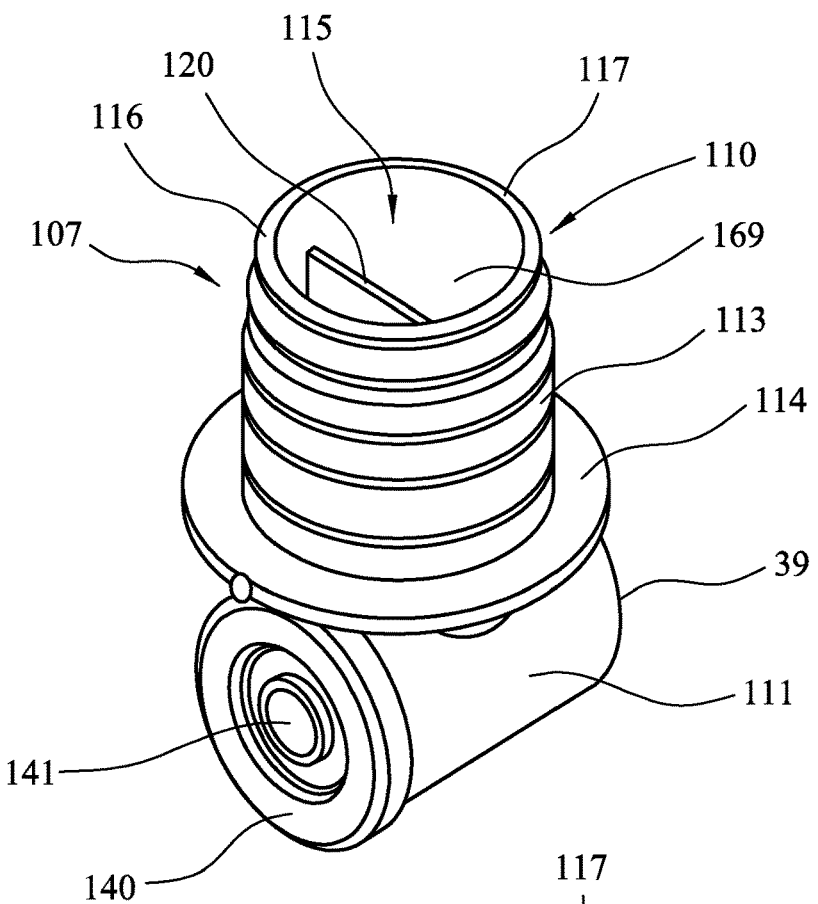
FIG. 12 is a perspective view of a pump assembly from above, one end and to one side.
Figure 13:
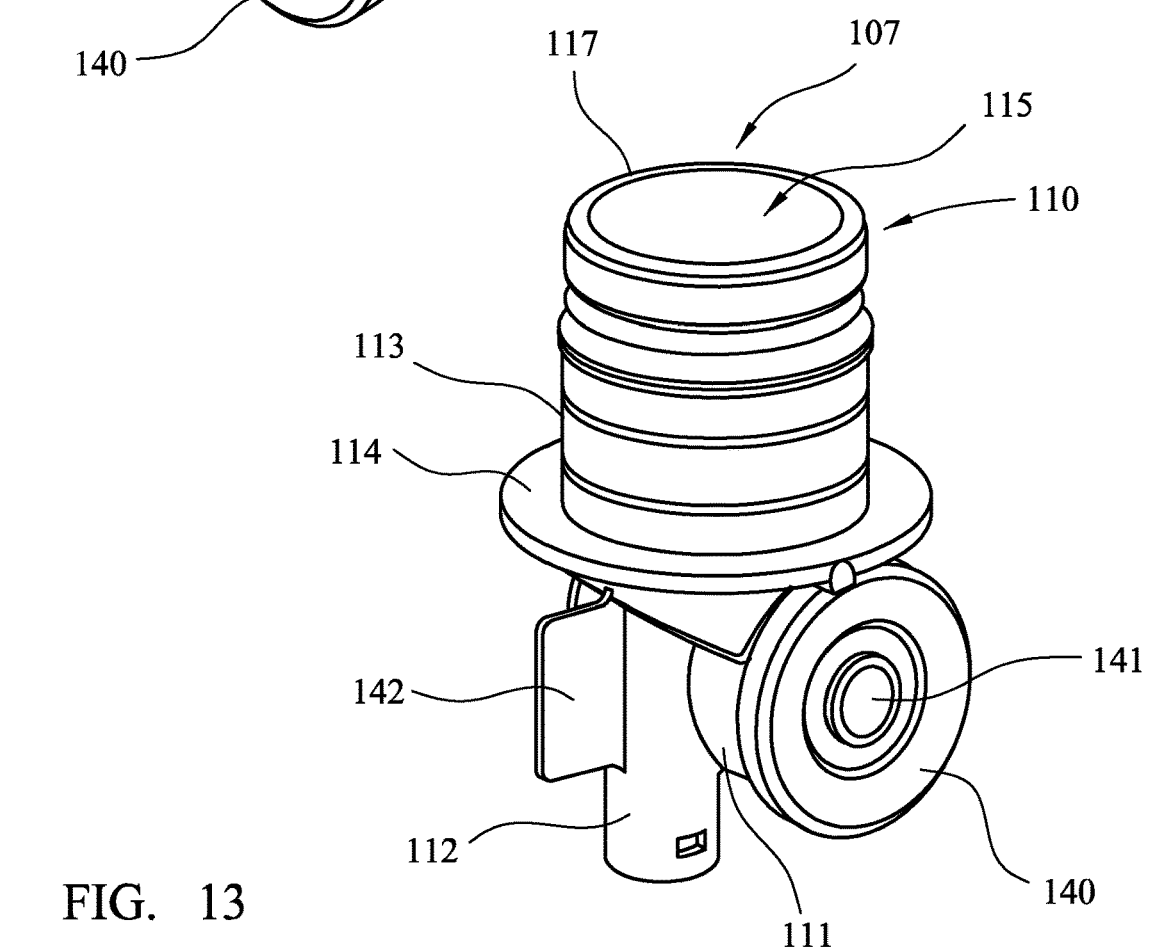
FIG. 13 is a perspective view of the pump assembly of FIG. 12 from above, one end and to the other side.

The arrangement shown in FIG. 2 which is suitably in a pre-assembled form may be engaged with the cradle 80 of FIG. 5 by slidably engaging support tubes 40, 42 within openings 85, 87 and engaging catch member 90 with catch member 92. During such engagement, drive shaft 44 engages the splined mechanism of pump 16 so that the pump can be driven by motor 18. A delivery pack 26 may then be placed on platform 58. When so disposed the apparatus may be arranged as shown in FIGS. 7 and 8. Thereafter carriage assembly 64 is operated to move it towards transfer pump 36, so that drive shaft 72 passes into opening 70 and engages the splined mechanism of the pump, thereby to define the arrangement shown in FIGS. 9 and 10. Pipe 100 may then be secured in position to define the arrangement of FIG. 11.

A central processing unit (CPU) (not shown) is associated with apparatus 2 and is arranged to operate the apparatus and receive data and/or feedback prior to and/or during operation of the apparatus, including the following:
  (a) the weight of the reservoir assembly 10 and the time the weight was determined as measured by load cells 6;
  (b) the rate of pumping by pump 16 and operation of motor 18 therefor;
  (c) the weight of delivery pack 26 and the time the weight was determined as measured by load cells 54;
  (d) the rate of pumping by pump 36 and operation of motor 38 therefor;
  (e) the level sensed by level sensor 22 and the time of sensing;
  (f) the throughput of polymer material in the melt processing apparatus;
  (g) the let down ratio for the amount of liquid formulation to be introduced into the polymer;
  (h) age of container 12 via an associated RFID tag/label;
  (i) age of pump 16 via an associated RFID tag/label, Advantageously, the apparatus 2 includes only a single tube 20 for delivering liquid colour formulation into polymer in a polymer processing machine. Thus, it will be appreciated there is no tube or connector connecting delivery pack 26 to reservoir assembly 10. As described, liquid formulation is delivered across an air gap between transfer pump 36 of delivery pack 26 and inlet 24 of the reservoir assembly. Whilst the lack of tubes or pipes reduces the number of parts which make up apparatus 2, advantageously it mitigates against the risk of leakage which may be associated with couplings and/or tubes which may be used to connect liquid flow paths in the prior art.

When the delivery pack 26 is not delivering liquid formulation (i.e. when transfer pump 36 is not being operated), the pump is automatically in a closed state. Thus, pump 36 acts as a valve which only opens on operation of pump motor 38.

Once delivery pack 26 has delivered its contents into reservoir assembly 12 and is empty, it may readily be recycled—the transfer pump 36 can be detached from the plastic bag of the bag-in-a-box arrangement 28, and each part recycled appropriately. The delivery pack 26 may be replaced with another delivery pack 26 containing the same liquid formulation or, if desired, a different liquid formulation. The new pack 26 can be secured in position coupled to transfer pump motor 38.

The reservoir assembly 10 comprises reservoir 12 and metering pump 16, along with any liquid formulation it contains. In addition, the assembly 10 includes a radio-frequency identification (RFID) tag which is arranged to record information relating to the use of the reservoir assembly 10. In particular, the RFID tag may record how long the assembly 10 has been used for, so that it may be replaced before the pump 16 goes beyond its useful lifetime.

Subject to pump 16 not having gone beyond its useful lifetime, the reservoir assembly 10 may be used to deliver liquid formulation into a plastics processing machine over a long period of time, with the reservoir 12 thereof being replenished from delivery pack 26. However, before the useful lifetime of the assembly 10 is reached, it may be removed from the apparatus and replaced. The removed assembly 10 may be treated to detach pump 16 from reservoir 12 and the RFID tag and the components recycled or otherwise disposed of. A new assembly 10 may be secured in position and coupled to motor 18.

A preferred pump design for use as transfer pump 38 or metering pump 16 is shown in FIGS. 12 to 16. Pump 107 comprises an inlet 110 leading to a housing 111 which communicates with an outlet 112. The pump 107 is formed entirely from a plastics material.

Figure 14:
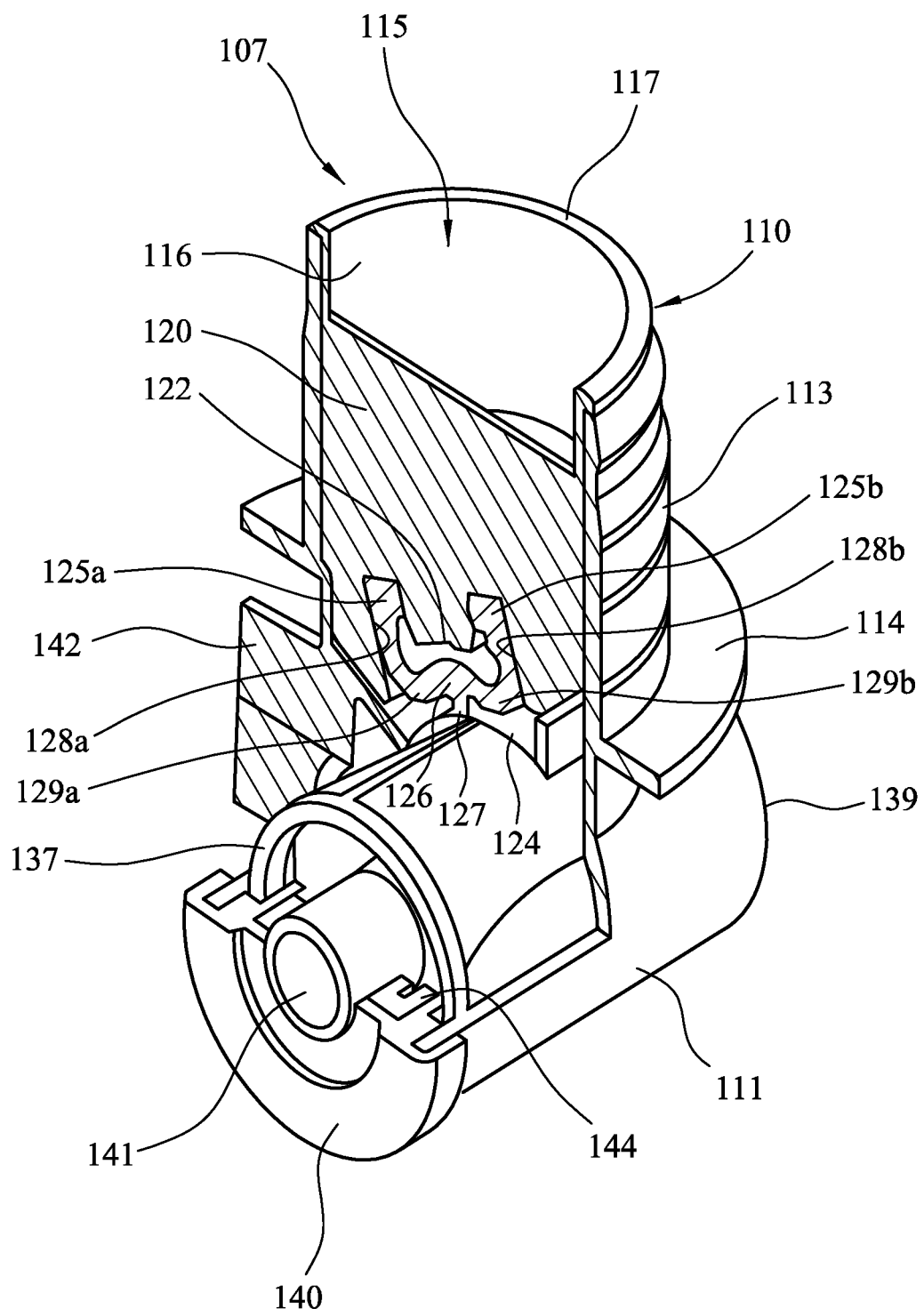
FIG. 14 is a similar view to FIG. 12 but showing an inlet of the pump assembly in cross-section.
Figures 15, 16:
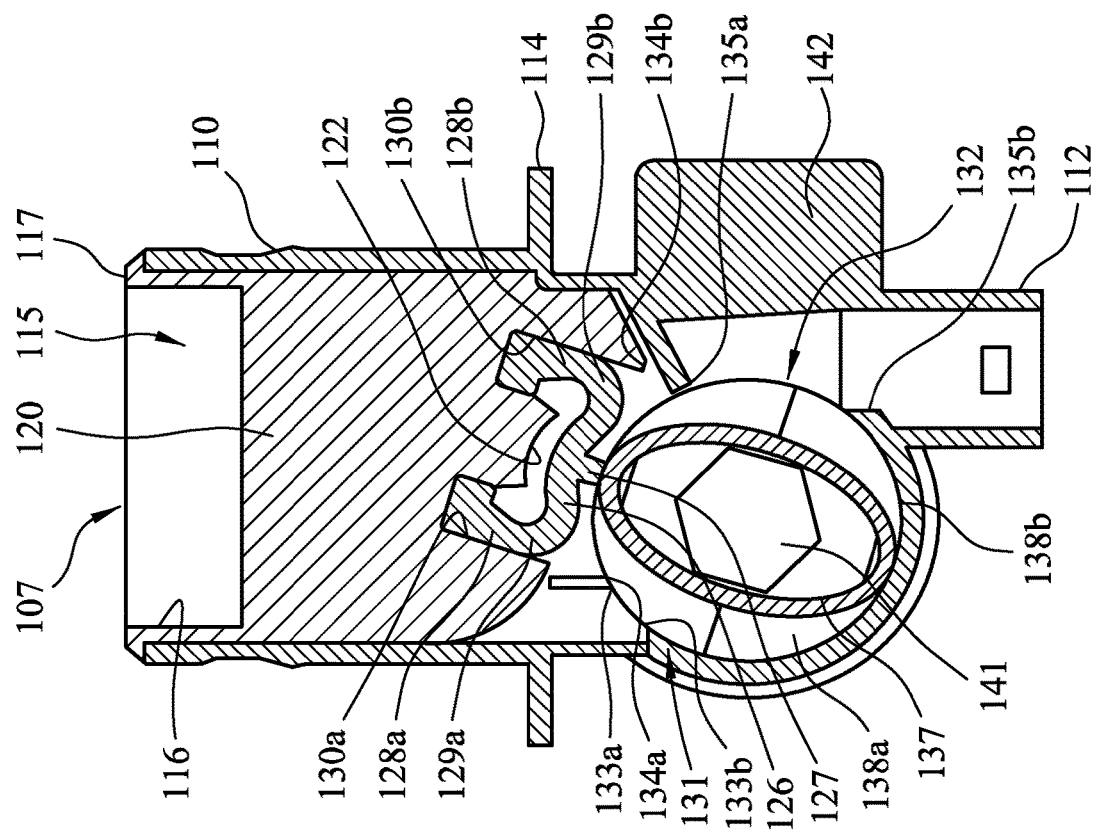
FIG. 15 is a cross-section through the pump assembly.
FIG. 16 is a cross-section through the pump assembly perpendicular to the cross-section of FIG. 15.

The inlet 110 is of circular cross-section and leads to a chamber 169 that sits on top of the housing 111. The chamber 169 has an open upper end and is provided with spaced annular ribs 113 for securing the pump through a push fit into an outlet of a container—for example an outlet of reservoir 12 or the bag-in-a-box arrangement 28. To allow this connection to be made mechanically, an annular flange 114 is provided around the exterior of the inlet 110 at the base of the inlet 110 for co-operation with a machine arranged to insert the chamber 169 into the container outlet. The chamber 169 contains a cap 115. The cap 115 has an annular body 116 that is a close fit within the chamber 169 and terminates in an outwardly directed flange 117 that sits on the open end of the chamber 169 and is fixed to the chamber 169 by, for example, ultrasonic welding, to connect the parts together. The cap 115 has, at its lower end, a disc-shaped closure 118 (see FIG. 15) that is provided with a number of passages to allow liquid to pass from the chamber 169 to the inlet 110. As seen in FIGS. 14 and 16, a rib 120 extends upwardly from the closure 118 and diametrically across the cap 115. A tube 121 extends upwardly from the closure 118 for holding an evacuation strip of known kind (not shown) that, in use, extends through the outlet of an associated container that is collapsible to prevent a collapsing container blocking the outlet to the container as the container is emptied.

The under surface of the closure 118 is formed with a shaped channel 122 that receives a spring 123.

The housing 111 is generally cylindrical in shape, closed at one end 39 and open at the other end. An axis of the housing 111 is normal to a plane including the centre line of the inlet 110 and the centre line of the outlet 112. The housing 111 is formed integrally with a flexible diaphragm seal 124 that extends along the axial length of the housing 111 and extends circumferentially for about 40° of the housing circumference. The diaphragm seal 124 is supported by the spring 123, which is an elongate member of inverted U-shape cross-section formed from an elastomeric material that is compliant, flexible and resilient, such as silicone rubber. The spring 123 has spaced arms 125a, 125b interconnected by a base portion 126 carrying a rib 127 on its exterior surface. The rib 127 extends parallel to the longitudinal axis of the member. The free ends of the spaced arms 125a, 125b are thickened. The spring 123 is inverted in the channel 122 with the outer side faces of the arms 25a, 25b pressing against the side walls 28a, 28b so that the ends 29a, 29b of the base portion 26 are fixed relative to the side walls 28a, 28b. The rib 27 bears against the under surface of the diaphragm seal 124. The channel 122 includes parallel spaced channels 130a 130b that receive respective free ends of the arms 125a, 125b to locate the spring 123 relative to the cap 115 and thus relative to the housing 111. The cap 115 compresses the spring 123 so that the rib 127 is forced against the diaphragm seal 124. The spring 123 and the seal 124 are thus located at the lower end of the chamber 69.

The housing 111 is formed with an inlet aperture 131 leading from the inlet 110 to the interior of the housing 111 and an outlet aperture 132 leading from the interior to the outlet 112. The outlet 112 is a tube of generally circular cross-section with an axis parallel to but spaced from the centre line of the inlet 10 and terminating in an open end.

The inlet aperture 131 has, in planes normal to the axis of the housing 111, a maximum dimension between a first portion 133a of the inlet aperture 131 adjacent a first lateral edge 134a of the seal 124 and a second portion 133b of the inlet aperture 131 to the same side as the seal 124 of a diameter of the housing 111 that is normal to a diameter of the housing 111 that passes through the centre of the rib 127, as seen in FIG. 16. The outlet aperture 132 has, in planes normal to the axis of the housing 111, a maximum dimension between a first portion 135a of the outlet aperture 132 adjacent a second lateral edge 134b of the seal 124 and a second portion 135b of the outlet aperture 132 to the same side as the seal 124 of the diameter of the housing 111 that is normal to a diameter of the housing 111 that passes through the centre of the rib 127, as also seen in FIG. 16.

The housing 111 contains a rotor 137 that is inserted into the housing 111 through the open end and that may be shaped in any convenient way to form with the housing 111 two chambers 138a, 138b. The rotor 137 includes a trunnion 143 by which it is axially positioned at the closed end 139 of the housing 111. The open end of the housing 111 is closed by a cap 140 carrying a rubber lip seal 144 (see FIG. 15) that prevents the leakage of fluid from the housing 111 through the open end around the cap 140. A spindle 141 is formed at the end of the rotor 137 and has a shaped interior aperture for receiving a complimentarily shaped drive shaft of a drive motor. The drive shaft bottoms out on the blind end of the aperture and the rotor 137 is positioned by and between the drive shaft and the cap 140 via the trunnion 143. The drive shaft may be spring loaded in known fashion to accommodate manufacturing tolerances.

The positioning of the second portions 133b, 135b of the inlet and outlet apertures 131, 132 mostly or wholly to the same side of a diameter of the housing 111 as the seal 124, as described above, is necessary because the rotor 137 has two apices spaced by 180° and it is necessary for one apex always to be in contact with the portion of the housing 111 between the inlet aperture 131 and the outlet aperture 132 in the direction of rotation of the rotor 137 to prevent direct communication between the inlet 110 and the outlet 111.

The inlet 110 is connected to a supply of liquid (e.g. from reservoir 12 or the bag-in-a-box arrangement 28) so that liquid enters the open end of the inlet 110. Starting from the bottom dead centre position shown in FIG. 16, fluid enters the chamber 138*a* at the inlet aperture 131 and exits the chamber 138*b* at the outlet aperture 132. The diaphragm seal 124 is urged by the spring 123 into engagement with the rotor 111 to prevent fluid passing from the outlet 112 to the inlet 110. On continued rotation of the rotor 137 anti-clockwise as shown in FIG. 16, the second shaped chamber 138*b* is decreased in volume by the rotation of the rotor 137 to force fluid from the second chamber 138*b* through the outlet aperture 132 to the outlet 112 while the volume of the first chamber 138*a* increases to draw fluid in from the inlet 110 through the inlet aperture 131. The diaphragm seal 124 remains in contact with the rotor 111 along the sealing line under the action of the spring 123.

Further rotation of the rotor 111 towards the bottom dead centre position (in which the rotor 37 is rotated by 90° from the position shown in FIG. 16) results in the first chamber 138*a* being closed by the housing 111 and containing a pre-determined volume of fluid. The second chamber 138*b* is partially in communication with the outlet 112 through the outlet aperture 132 and partly in communication with the inlet aperture 131 for the receipt of fluid from the inlet 110. The diaphragm seal 124 remains in contact with the rotor 137 under the action of the spring 123 to prevent the passage of fluid between the outlet 112 and inlet 110.

The continued rotation of the rotor 111 (beyond 90° from the position shown in FIG. 16) results in the first chamber 138*a* opening onto the outlet aperture 132 so that substantially all of the fluid in the first chamber 138*a* exits to the outlet 112. The second chamber 138*b* communicates with the inlet 110 so drawing further fluid into the second chamber 138*b*. The diaphragm seal 112 remains in contact with the rotor 111 along the sealing line under the action of the spring 123.

Continued rotation of the rotor 11 continues this action to pump fluid from the inlet 110 to the outlet 112.

The inlet 10, the housing 11, the inlet aperture 31, the outlet 12, the outlet aperture 32, the chamber 69 and the diaphragm seal 24 are formed in one-piece as a single moulded part in a single moulding operation.

In general terms, the apparatus may be operated as follows:
(i) Liquid formulation is delivered from delivery pack 26 into reservoir assembly 10. The change in weight of the delivery pack 26 may be monitored by load cells 54 and information passed to the CPU.
(ii) The level of liquid formulation is monitored over time by sensor 22 and information communicated to the CPU. The CPU suitably controls delivery from the assembly 10 into reservoir assembly 10 so the level is between upper and lower limits, between which the reservoir 12 is of constant cross-section. By utilising such control, changes in the level of liquid formulation in reservoir 12 is directly proportional to volume of liquid formulation. Thus, this can be used to provide a volumetric measurement of the amount of liquid formulation delivered via tube 20 over time.
(iii) The weight of reservoir assembly 10 is monitored over time by load cells 6 to provide a gravimetric method for determining the amount of liquid formulation delivered via tube 20 over time which may be compared to the volumetric measurement.
(iv) The rate of operation of metering pump 16, controlled by the CPU, determines the rate of injection of liquid formulation via tube 20 into, for example a polymeric material in a melt-processing apparatus.
(v) Periodically, liquid formulation in reservoir 12 is automatically replenished from delivery pack 26, under control of CPU.

Although the rate of delivery of liquid formulation may be assessed by the change in weight of reservoir assembly 10 and/or the rate of change of the level of liquid formulation as measured by sensor 22, it is preferred that the primary determiner for the rate of delivery of liquid formulation is via a calibrated metering pump 16. The other method may be used to verify the rate delivered by the metering pump 16.

Further detail on assembly and operation of apparatus 2 may be as follows:
1. Apparatus 2 is unpacked from its box and assembled. The apparatus may be arranged on a frame or trolley at an ergonomic height to ensure safe operation.
2. Cradle 80 including metering pump 16 is located on the weighing platform 4. More specifically, the following steps may be undertaken:
   a. The cradle 80 is slid onto the support tubes 40, 42 ensuring that the assembly aligns with the metering pump drive shaft 44 sensors and catch 92 which retains the cradle 80 in position.
   b. As the cradle 80 is slid towards the rear of the weighing platform 4, but before the pump 16 meets the shaft 44, a reflective proximity sensor senses the shoulder of the reservoir 12 and the CPU starts the oscillation of the metering pump motor to facilitate shaft engagement.
   c. As the cradle 80 is picked-up by the reflective proximity sensor, an RFID reader also detects the presence of a tag/adhesive label on the shoulder of the reservoir 12 which enables writing down to the RFID tag/label.
   d. When the cradle 80 fully engages and is pulled "home" by cooperation of catch members 90, 92, the cradle 80 rests within the field (not touching) of an inductive sensor which communicates with the CPU which acknowledges that the cradle 80 is fully engaged and stops the metering pump oscillation accordingly.
   e. Tube 20 is then routed from the pump 16 through the clip 102 which is arranged on flange 50 to prevent flexure, vibration or pull on the tube from transmitting to the weighing platform which monitors the content of the reservoir 12.
3. A filled bag-in-a-box arrangement 28 is placed onto the platform 4. More specifically, the following may apply:
   a. The transfer pump 36 is pre-installed in the neck of the receptacle 32 which acts as a cap/closure during shipment to the customer from a production facility.
   b. Arrangement 28 is partially opened by tearing-out perforated cardboard panels to expose the transfer pump 36.
   c. Arrangement 28 is placed onto the platform 4 and the transfer pump 36 pulled-down on an extensible, flexible neck incorporated into the receptacle 32.
   d. The transfer pump motor 38 is engaged with the transfer pump 36 by sliding the motor towards the pump shaft. Engagement is facilitated by an oscillating action of the drive shaft 2.
   e. The CPU acknowledges that a bag-in-a-box arrangement 28 is fitted on the platform 4 by sensing that a transfer pump is located ahead of the motor. This may be accomplished with a reflectance proximity sensor.
4. With a cradle 80, including metering pump 16 and bag-in-a-box arrangement 28 in-place, the CPU monitors the level within the reservoir 12 and will seek to fill the reservoir from the bag-in-a-box arrangement 28. More details is as follows:
  a. The level in reservoir 12 is determined by the ultrasonic sensor 22 arranged above inlet 24.
  b. Sensor 22 may be a digital device with two pre-determined switching points:
    i. An upper level which the transfer pump 36 fills to
    ii. A lower level at which the transfer pump 36 will begin to replenish the reservoir 12 when the level has dropped sufficiently—if the level reaches this low-point and is not quickly recovered by switching on the transfer pump 36, an alarm is raised to call an operator.
  c. As an alternative, level sensor 22 may be an analogue device giving a continuous reading of level to the CPU:
    i. Upper level and lower level points can be adjusted within the CPU but work equivalently to the pre-programmed digital switch-points referred to.
  d. An alarm may be raised to the operator that the transfer of liquid from the arrangement 28 to the reservoir 12 is insufficient. This may indicate a problem, but more likely indicates that the receptacle 32 is empty and needs to be replaced.
5. The apparatus may be calibrated manually or automatically, for example to determine an effective gram per revolution value for the specific metering pump 16 and additive combination.
6. Via an input screen associated with the CPU, the operator can directly input the necessary parameters for liquid formulation to be contacted with polymer to be processed in a melt-processing apparatus, as follows:
  i. For an injection moulding application:
    SHOT WEIGHT g—weight of polymer per machine cycle
    (Let-down-ratio) LDR %—additive % by weight (0-10%).
  ii. For an extrusion or other continuous forming application:
    WEIGHT/HR Kg—weight of polymer processed per hour
    LDR %—additive % by weight (0-10%).
7. Once set-up, the operator can start the unit, it will respond to an external signal from the processing equipment and will deliver the determined amount according to throughput or for each subsequent cycle of the process.
8. During operation, the reservoir 12 should be periodically replenished with liquid formulation without intervention:
  a. When the delivery pack 26 is empty and requires replacement an alarm is raised.
  b. The delivery pack 26 can be replaced while the metering pump 16 continues to deliver from the residual material in reservoir 12.
  c. Periodically, the unit records the number of rotations completed by the metering pump 16 back to the RFID tag/label on the attached reservoir.
    i. This provides a continuous record of the pump life remaining
    ii. Unit will indicate to the operator when a metering pump is due for renewal
    iii. Record stays with the pump and is carried on the RFID tag/label if the cradle including pump moves between units or is stored in-between periods of use.

In some cases, it may be desired to change the identity of the liquid colour formulation to be introduced into polymer in a melt processing machine. To this end, delivery pack 26 may be disengaged from transfer pump motor 38 and may then be stored for subsequent use. As mentioned above, pump 36 which remains attached to the bag-in-a-box arrangement 28 acts as a closed valve, thereby avoiding any leakage of colour formulation from the delivery pack 26. In addition, reservoir assembly 10 is disengaged from motor 18. At the outlet of the reservoir assembly 10, pump 16 remains attached to reservoir 12 and acts as a closed valve thereby preventing any leakage of colour formulation from the reservoir assembly 10 at the outlet. The inlet 24 of assembly 10 may be closed using a screw-threaded cap (not shown). The removed, liquid-tight assembly 10 may be stored for re-use. Finally, tube 20 may be replaced. Thus, it will be appreciated that the identity of colour formulation to be delivered by the apparatus 2 can easily and rapidly be changed as described.

A company operating apparatus 2 may have an inventory comprising apparatus 2 and a series of pairs of reservoir assemblies 10 and delivery packs 28, wherein each pair contains the same liquid formulation (and may be used together as part of apparatus 2). Different pairs may include different liquid colour formulations.

After a period of time, components of the metering pump 16 may become worn such that it is unable to meter formulation with sufficient accuracy. In this case, the reservoir assembly 10 may be replaced with a new reservoir assembly which includes a new pump 16. The old reservoir assembly may be disassembled and components recycled as appropriate.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for dosing a fluid formulation into a polymeric material, the apparatus comprising:
   (i) a container (A) for containing the fluid formulation, wherein said container (A) includes an outlet for fluid formulation;
   (ii) a reservoir assembly for containing fluid formulation transferred from container (A), wherein said reservoir assembly includes an inlet for receiving fluid formulation transferred from container (A);
   wherein said outlet of said container (A) is arranged to deliver fluid formulation across an air gap into said reservoir assembly;
   wherein said inlet of said reservoir assembly is defined in a top wall of said reservoir assembly and/or said inlet defines an opening which faces upwardly, said opening having a maximum width in the range 2 to 10 cm and/or an area through which fluid formulation passes in use of at least 4 cm$^2$ and less than 70 cm$^2$; and/or
   said reservoir assembly has a total internal volume of at least 2 litres and less than 50 litres.

2. Apparatus according to claim 1, wherein container (A) includes a first pump which is a positive displacement pump; wherein said first pump is arranged to operate as a closure means for container (A) when fluid is not being pumped from container (A).

3. Apparatus according to claim 2, wherein said container (A) includes said first pump and a container portion arranged to contain fluid formulation, said first pump being directly connected and/or abutting an outlet of said container portion, wherein no pipe extends between said container portion and said first pump.

4. Apparatus according to claim 1, wherein said outlet of container (A) is vertically aligned with said inlet of said reservoir assembly.

5. Apparatus according to claim 1, wherein said reservoir assembly has a substantially constant internal cross-sectional area over a length L, wherein L is at least 25 mm and is less than 400 mm; and/or the volume of fluid which can be contained within said substantially constant cross-sectional area is at least 500 cm$^3$ and less than 20000 cm$^3$.

6. Apparatus according to claim 1, wherein said reservoir assembly includes said inlet for input of the fluid formulation into the reservoir assembly, wherein said inlet is positioned in an upper part of the reservoir assembly above a maximum fill level of said reservoir assembly, wherein data on said maximum fill level is stored in a central processing unit (CPU) which is a component of said apparatus.

7. Apparatus according to claim 1, wherein said apparatus includes a level sensor for assessing the level of fluid formulation in said reservoir assembly, wherein said level sensor is arranged to communicate level information to a CPU.

8. Apparatus according to claim 1, wherein said apparatus includes a first weighing means for monitoring the weight of said reservoir assembly and its contents wherein said first weighing means is arranged to communicate information relating to the weight of said reservoir assembly over time to said CPU.

9. Apparatus according to claim 1, wherein container (A) has a greater total internal volume than said reservoir assembly and the ratio of the total internal volume of container (A) divided by the total internal volume of said reservoir assembly is 1.5 to 10.

10. Apparatus according to claim 1, wherein said apparatus includes a second weighing means for monitoring the weight of container (A) and its contents, wherein said weighing means is arranged to communicate information relating to the weight of container (A) over time to a CPU.

11. Apparatus according to claim 1, said apparatus being in combination with a melt-processing apparatus, so an outlet of the apparatus is arranged to deliver fluid formulation from said apparatus to polymeric material arranged to be melt-processed in said melt-processing apparatus.

12. Apparatus according to claim 1, wherein said reservoir assembly contains a fluid formulation and container (A) includes an identical fluid formulation, wherein said fluid formulation has a viscosity of at least 1000 cP and less than 75,000 cP.

13. A method of dosing a fluid formulation into a polymeric material, the method comprising selecting the apparatus of claim 1 and further comprising:
(a) delivering fluid formulation from container (A) to said reservoir assembly; and
(b) delivering fluid formulation into said polymeric material downstream of said reservoir assembly.

14. A method according to claim 13, the method comprising:
delivering fluid formulation across an air gap on passage from container (A) into said reservoir assembly and, during the method, the fluid formulation falls through a distance of at least 1 mm across said air gap; and/or
said method comprises a CPU controlling operation of a second pump which is arranged to pump fluid formulation from said reservoir assembly to deliver fluid formulation into said polymeric material; and/or said method comprises an operator inputting information into said CPU in dependence on a desired dose rate of said fluid formulation into said polymeric material; and/or
said method comprises the CPU receiving information related to the level of fluid formulation in said reservoir assembly.

15. Apparatus for dosing a fluid formulation into a polymeric material, the apparatus comprising:
(i) a container (A) for containing the fluid formulation, wherein said container (A) includes an outlet for fluid formulation;
(ii) a reservoir assembly for containing fluid formulation transferred from container (A), wherein said reservoir assembly includes an inlet for receiving fluid formulation transferred from container (A):
wherein said outlet of said container (A) is arranged to deliver fluid formulation across an air gap into said reservoir assembly;
wherein said reservoir assembly includes a second pump for pumping liquid formulation from said reservoir assembly, wherein said reservoir assembly comprises a reservoir and said second pump and wherein no pipe extends between an outlet of said reservoir and said second pump.

16. Apparatus according to claim 15, wherein a pipe is connected to an outlet of said second pump wherein said pipe is arranged to deliver fluid formulation into polymeric material associated with a melt processing apparatus.

17. Apparatus according to claim 15, wherein said second pump is a positive displacement pump and said reservoir assembly includes a closure means which is an integral part of said reservoir assembly and said second pump is arranged to operate as a closure means for said reservoir assembly when fluid is not being pumped from said reservoir.

18. Apparatus for dosing a fluid formulation into a polymeric material, the apparatus comprising:
(i) a container (A) for containing the fluid formulation, wherein said container (A) includes an outlet for fluid formulation;
(ii) a reservoir assembly for containing fluid formulation transferred from container (A), wherein said reservoir assembly includes an inlet for receiving fluid formulation transferred from container (A);
wherein said outlet of said container (A) is arranged to deliver fluid formulation across an air gap into said reservoir assembly;
wherein a CPU associated with the apparatus for dosing is arranged to receive an input related to a rate of injection of said fluid formulation into polymeric material which may be present in a melt-processing apparatus associated with said apparatus; and/or
a CPU associated with the apparatus for dosing is arranged to receive an input related to a let-down-ratio (LDR).

19. Apparatus for dosing a fluid formulation into a polymeric material, the apparatus comprising:
(i) a container (A) for containing the fluid formulation, wherein said container (A) includes an outlet for fluid formulation;
(ii) a reservoir assembly for containing fluid formulation transferred from container (A), wherein said reservoir assembly includes an inlet for receiving fluid formulation transferred from container (A);
wherein said outlet of said container (A) is arranged to deliver fluid formulation across an air gap into said reservoir assembly;

wherein container (A) includes a first pump which is a positive displacement pump, wherein said first pump is arranged to operate as a closure means for container (A) when fluid is not being pumped from container (A);

wherein said outlet of container (A) is vertically aligned with said inlet of said reservoir assembly;

wherein said reservoir assembly has a substantially constant internal cross-sectional area over a length L, wherein L is at least 25 mm and is less than 400 mm; and/or the volume of fluid which can be contained within said substantially constant cross-sectional area is at least 500 $cm^3$ and less than 20000 $cm^3$, wherein said apparatus includes a level sensor for assessing the level of fluid formulation in said reservoir assembly, wherein said level sensor is arranged to communicate level information to a CPU;

wherein said apparatus includes a first weighing means for monitoring the weight of said reservoir assembly and its contents wherein said first weighing means is arranged to communicate information relating to the weight of said reservoir assembly over time to a CPU;

wherein said reservoir assembly includes a second pump for pumping liquid formulation from said reservoir assembly, wherein said reservoir assembly comprises a reservoir and said second pump and wherein no pipe extends between an outlet of said reservoir and said second pump.

* * * * *